US012801737B2

(12) United States Patent
Lavoie et al.

(10) Patent No.: US 12,801,737 B2
(45) Date of Patent: Nov. 17, 2026

(54) PERMISSION CHECKER FOR STATIC CODE ANALYSIS TOOL

(71) Applicant: Oracle International Corporation, Redwood Shores, CA (US)

(72) Inventors: Thierry Lavoie, Calgary (CA); David Seekatz, Calgary (CA); David Melski, Wellington (NZ)

(73) Assignee: Oracle International Corporation, Redwood Shores, CA (US)

( * ) Notice: Subject to any disclaimer, the term of this patent is extended or adjusted under 35 U.S.C. 154(b) by 63 days.

(21) Appl. No.: 18/955,959

(22) Filed: Nov. 21, 2024

(65) Prior Publication Data

US 2026/0141066 A1 May 21, 2026

(51) Int. Cl.
*G06F 21/56* (2013.01)
*G06F 21/57* (2013.01)

(52) U.S. Cl.
CPC .......... *G06F 21/563* (2013.01); *G06F 21/577* (2013.01); *G06F 2221/033* (2013.01)

(58) Field of Classification Search
CPC . G06F 21/563; G06F 21/577; G06F 2221/033
See application file for complete search history.

(56) References Cited

U.S. PATENT DOCUMENTS

| | | | | |
|---|---|---|---|---|
| 5,838,980 A * | 11/1998 | Guillen | G06F 8/49 | 717/148 |
| 5,987,608 A * | 11/1999 | Roskind | G06F 21/53 | 726/14 |
| 6,223,337 B1 * | 4/2001 | Blume | G06F 11/3688 | 717/130 |
| 6,813,761 B1 * | 11/2004 | Das | G06F 8/433 | 717/154 |
| 6,938,186 B2 * | 8/2005 | Das | G06F 11/3608 | 717/126 |
| 7,089,537 B2 * | 8/2006 | Das | G06F 8/433 | 717/126 |
| 7,886,282 B1 * | 2/2011 | Satish | G06F 21/54 | 717/133 |

(Continued)

OTHER PUBLICATIONS

Graa et al., Tracking Explicit and Control Flows in Java and Native Android Apps Code, ICISSP, 2016.*

(Continued)

*Primary Examiner* — David Garcia Cervetti
(74) *Attorney, Agent, or Firm* — Lathrop GPM LLP

(57) ABSTRACT

A method includes obtaining a data flow graph of a unit of computer program code. The unit of computer program code includes a dataflow fact. The data flow graph has a data flow path corresponding to the dataflow fact. The method further includes augmenting the data flow graph by adding a correlation to the dataflow fact of the data flow graph according to an instruction type in the unit of computer program code. An augmented data flow graph is obtained, having a first set of data flow paths corresponding to the dataflow fact. The method further includes merging a first data flow path and a second data flow path of the first set of data flow paths corresponding to the dataflow fact, to obtain a transformed data flow graph having a second set of data flow paths corresponding to the dataflow fact.

20 Claims, 9 Drawing Sheets

200

(56) References Cited

U.S. PATENT DOCUMENTS 8,365,152 B2 * 1/2013 Balakrishnan ...... G06F 11/3608 717/138
8,381,192 B1 * 2/2013 Drewry ............... G06F 11/3636 717/124
8,726,245 B2 * 5/2014 Haviv ....................... G06F 8/20 717/106
8,739,280 B2 * 5/2014 Chess ................... G06F 21/554 726/22
8,776,026 B2 * 7/2014 Candea ............... G06F 11/3698 717/126
8,826,255 B1 * 9/2014 Avadhanula ............ G06F 8/433 717/154
8,881,293 B1 * 11/2014 Brucker .................... G06F 8/75 717/136
8,893,102 B2 * 11/2014 Keynes ..................... G06F 8/74 717/157
9,117,072 B2 * 8/2015 Ludwig ................... G06F 21/55
9,128,728 B2 * 9/2015 Siman ................. G06F 16/9024
9,152,796 B2 * 10/2015 Gluck ................. G06F 11/3466
9,235,392 B2 * 1/2016 Dally .................... G06F 8/4432
9,280,446 B2 * 3/2016 Abadi ................. G06F 11/3612
9,507,945 B2 * 11/2016 Kouskoulas .......... G06F 21/577
9,529,587 B2 * 12/2016 Voss .......................... G06F 8/72
9,530,016 B1 * 12/2016 Pomerantz ............ G06F 21/566
9,807,101 B1 * 10/2017 Lu ......................... H04L 63/105
10,540,255 B2 * 1/2020 Ramesh .............. G06F 11/3612
10,614,224 B2 * 4/2020 Dietsch ................. G06F 21/577
10,650,149 B2 * 5/2020 Dietsch ................... G06F 30/33
10,768,913 B2 * 9/2020 Howlett .................... G06F 8/75
10,789,362 B2 * 9/2020 Allen .................... G06F 21/554
10,824,538 B2 * 11/2020 Krishnan ............ G06F 11/3612
10,956,135 B1 * 3/2021 Raphael ................... G06N 5/02
11,029,927 B2 * 6/2021 Chofleming, Jr. ...... G06F 8/443
11,106,440 B2 * 8/2021 Beit-Aharon ............. G06F 8/51
11,568,130 B1 * 1/2023 Gaucher ............... G06F 40/186
11,650,907 B2 * 5/2023 Chimdyalwar ....... G06F 11/302 717/124
11,663,334 B1 * 5/2023 Briliauskas ........... G06F 21/566 726/24
11,829,751 B1 * 11/2023 Fitzpatrick ................ G06F 8/74
11,989,537 B2 * 5/2024 de Jong .............. G06F 11/3466
12,106,073 B2 * 10/2024 Bartolotta ............... G06F 8/443
12,259,805 B1 * 3/2025 Kouskoulas ........ G06F 11/3636
12,572,820 B2 * 3/2026 Choudhary ............. G06F 8/433
2003/0163801 A1 * 8/2003 Thames .................... G06F 8/73 715/205
2003/0226060 A1 * 12/2003 Das ..................... G06F 11/3608 714/38.1
2004/0088689 A1 * 5/2004 Hammes ................. G06F 8/447 717/154
2004/0117772 A1 * 6/2004 Brand ................. G06F 11/3608 714/E11.207
2005/0166167 A1 * 7/2005 Ivancic ............... G06F 11/3608 703/22
2005/0216821 A1 * 9/2005 Harada ................. H04L 27/183 714/801
2006/0282807 A1 * 12/2006 Ivancic ............... G06F 11/3608 716/106
2007/0038975 A1 * 2/2007 Lennon ............... G06F 11/3644 714/E11.209
2007/0130114 A1 * 6/2007 Li ......................... G06F 8/4442
2009/0007087 A1 * 1/2009 Ito ....................... G06F 11/3604 714/E11.207
2009/0119624 A1 * 5/2009 Chess ................. G06F 11/3608 716/106
2009/0193401 A1 * 7/2009 Balakrishnan ...... G06F 11/3608 717/144
2009/0328009 A1 * 12/2009 Scholz ...................... G06F 8/70 717/132
2010/0070804 A1 * 3/2010 Bolignano .............. G06F 11/28 714/E11.179
2010/0313187 A1 * 12/2010 Tan ..................... G06F 11/3676 717/124
2010/0325621 A1 * 12/2010 Andrade ................. G06F 8/433 717/156
2011/0137930 A1 * 6/2011 Hao .................... G06F 16/9024 707/769
2011/0145799 A1 * 6/2011 Bartolomeo ........ G06F 11/3604 717/124
2011/0154307 A1 * 6/2011 Upton ................... G06T 15/005 717/146
2011/0239203 A1 * 9/2011 Sukumaran ......... G06F 11/3604 717/157
2011/0239204 A1 * 9/2011 Sukumaran ......... G06F 11/3604 717/157
2012/0137277 A1 * 5/2012 Varadarajan ............ G06F 8/433 717/155
2012/0159452 A1 * 6/2012 DeLine ................... G06F 8/427 717/125
2012/0192161 A1 * 7/2012 Pistoia ................ G06F 11/3604 717/131
2012/0210432 A1 * 8/2012 Pistoia ................ G06F 11/3604 726/25
2013/0031531 A1 * 1/2013 Keynes ..................... G06F 8/74 717/126
2013/0055208 A1 * 2/2013 Murthy ................... G06F 8/315 717/126
2013/0268549 A1 * 10/2013 Delling ............... G06F 16/9024 707/769
2014/0013313 A1 * 1/2014 Eker ....................... G06F 8/436 717/132
2014/0130154 A1 * 5/2014 Dolby ................. H04L 63/1408 726/22
2014/0173571 A1 * 6/2014 Gluck ..................... G06F 21/54 717/130
2014/0337975 A1 * 11/2014 Wang .................... G06F 21/566 726/23
2015/0020205 A1 * 1/2015 Wang .................... G06F 21/577 726/25
2015/0205707 A1 * 7/2015 Dwarakanath ...... G06F 11/3608 717/124
2015/0309813 A1 * 10/2015 Patel ................... G06F 11/3698 703/22
2015/0356294 A1 * 12/2015 Tan ..................... G06F 9/30054 726/22
2015/0370560 A1 * 12/2015 Tan ......................... G06F 9/323 717/148
2016/0063247 A1 * 3/2016 Farjon ................... G06F 21/562 726/23
2016/0179504 A1 * 6/2016 Voss .......................... G06F 8/72 717/120
2016/0219066 A1 * 7/2016 Vasseur ............... H04L 63/1458
2017/0004303 A1 * 1/2017 Yan ....................... G06F 21/562
2017/0017472 A1 * 1/2017 He ........................... G06F 8/433
2017/0060735 A1 * 3/2017 Yoshida .............. G06F 11/3688
2017/0147475 A1 * 5/2017 Abadi ..................... G06F 8/433
2017/0154088 A1 * 6/2017 Sherman ................. G06F 16/26
2017/0154089 A1 * 6/2017 Sherman ................. G06F 16/54
2017/0213027 A1 * 7/2017 Gu ........................ G06F 21/556
2017/0220455 A1 * 8/2017 Badran ............... G06F 11/3684
2017/0277521 A1 * 9/2017 Sharma ..................... G06F 8/31
2018/0218154 A1 * 8/2018 Kanei ................. G06F 21/6218
2018/0246706 A1 * 8/2018 Fan ......................... G06F 8/433
2018/0357049 A1 * 12/2018 Epstein ............... G06F 9/44505
2018/0373509 A1 * 12/2018 Zhang ........................ G06F 8/37
2019/0129826 A1 * 5/2019 Ramesh .............. G06F 11/3604
2019/0326012 A1 * 10/2019 Witt ....................... G16H 10/60
2019/0377558 A1 * 12/2019 Bach ......................... G06F 8/71
2020/0004659 A1 * 1/2020 Soares ................ G06F 11/3608
2020/0042706 A1 * 2/2020 Allen ......................... G06F 8/10
2020/0104491 A1 * 4/2020 Boulton ................ G06F 21/577
2020/0125732 A1 * 4/2020 Iyer ..................... G06F 11/3612
2020/0159934 A1 * 5/2020 Yamaguchi ......... G06F 16/9024
2020/0310766 A1 * 10/2020 Haehnle ..................... G06F 8/30
2021/0019126 A1 * 1/2021 Rabinovitch ............. G06F 8/40
2021/0026760 A1 * 1/2021 Huth ................... G06F 11/0772
2021/0096832 A1 * 4/2021 Rich ..................... G06F 40/154
2021/0216434 A1 * 7/2021 Stelmar Netto ...... G06F 9/4484
2021/0232579 A1 * 7/2021 Schechter ................. G06F 8/34
2021/0294717 A1 * 9/2021 Wang .................. G06F 11/3409

(56) References Cited

U.S. PATENT DOCUMENTS

| | | | | |
|---|---|---|---|---|
| 2021/0334385 | A1* | 10/2021 | Gauthier | H04L 63/1433 |
| 2021/0365565 | A1* | 11/2021 | Kum | G06F 21/577 |
| 2022/0004642 | A1* | 1/2022 | Pujar | G06F 21/577 |
| 2022/0179965 | A1* | 6/2022 | Allen | G06F 21/14 |
| 2022/0245009 | A1* | 8/2022 | Vasiljevic | H04L 67/566 |
| 2022/0300615 | A1* | 9/2022 | Sahu | G06F 21/577 |
| 2022/0309104 | A1* | 9/2022 | Armbrust | G06F 16/9024 |
| 2023/0037616 | A1* | 2/2023 | Karri | G06F 21/53 |
| 2023/0107164 | A1* | 4/2023 | Abadi | G06F 8/75<br>726/25 |
| 2023/0169164 | A1* | 6/2023 | Bishop, III | G06F 21/563<br>726/23 |
| 2023/0169177 | A1* | 6/2023 | Bishop, III | G06F 8/71<br>726/25 |
| 2023/0169180 | A1* | 6/2023 | Vorobyov | G06F 21/563<br>726/25 |
| 2023/0208855 | A1* | 6/2023 | Sheriff | H04L 41/0631<br>726/22 |
| 2023/0342466 | A1* | 10/2023 | Briliauskas | G06N 3/08 |
| 2023/0359668 | A1* | 11/2023 | Schechter | G06F 8/36 |
| 2024/0119159 | A1* | 4/2024 | Navarro-Dimm | G06F 21/577 |
| 2024/0143299 | A1* | 5/2024 | Jana | G06F 8/433 |
| 2024/0354424 | A1* | 10/2024 | Najafirad | G06F 21/577 |
| 2024/0385855 | A1* | 11/2024 | Yasue | G06F 9/448 |
| 2024/0394375 | A1* | 11/2024 | Al-Kassar | G06F 21/577 |
| 2025/0005166 | A1* | 1/2025 | Kasper | G06F 21/577 |
| 2025/0021348 | A1* | 1/2025 | Moghe | G06F 9/448 |
| 2025/0077666 | A1* | 3/2025 | van Buul | G06F 8/433 |
| 2025/0165600 | A1* | 5/2025 | Fung | G06N 3/126 |
| 2025/0173582 | A1* | 5/2025 | Mishra Gupta | G06N 5/022 |
| 2026/0032002 | A1* | 1/2026 | Koyfman | H04L 9/3249 |
| 2026/0044322 | A1* | 2/2026 | Mistry | G06F 8/41 |
| 2026/0119229 | A1* | 4/2026 | Mishra | G06F 9/485 |

OTHER PUBLICATIONS

Kan et al., Cross-Language Taint Analysis: Generating Caller-Sensitive Native Code Specification for Java, IEEE, Jun. 2024.*

Belyaev et al., Comparative Analysis of Two Approaches to Static Taint Analysis, Programming and Computer Software, 2018.*

Allen, N., et al., "IFDS Taint Analysis with Access Paths", Mar. 18, 2021, 12 pages.

Das, M., et al., "ESP: Path-Sensitive Program Verification in Polynomial Time", PLDI'02, Jun. 17-19, 2022, 12 pages.

Reps, T., et al., "Precise Interprocedural Dataflow Analysis via Graph Reachability", POPL '95, Jan. 25, 1995, 13 pages.

* cited by examiner

500
Examples of sensitive operations with proper and improper checking of dataflow facts from taint sources Proper permissions check in source code: 502

```
public static void scanFile(Context context, String
    filePath) {
    Intent intent = new Intent("android.intent.action.SCAN
    FILE");
    intent.setData(Uri.fromFile(new File(filePath)));
    if (PolicyService.allowIntent(intent)) {
      context.sendBroadcast(intent);
```

Developer may fail to obtain the correct permission: 504

```
public static void scanFile(Context context,
    String filePath) { Intent intent = new
    Intent("android. intent.action.SCAN FILE");
    intent.setData(Uri.fromFile(new
    File(filePath))); //no permission obtained
context.sendBroadcast(intent);
```

Developer may obtain the wrong permission: 506

```
public static void scanFile(Context context, String
filePath) {
Intent intent = new Intent("android. intent.action.SCAN
FILE");
intent.setData(Uri.fromFile(new File(filePath)));
if (PolicyService.allowJsonObjectRequest(new
JsonObjectRequest(...))) {
context.sendBroadcast(intent);
```

Developer may invert the permission condition: 508

```
public static void scanFile(Context context,
    String filePath) { Intent intent = new
    Intent("android.intent.action.SCAN FILE");
    intent.setData(Uri.fromFile(new
    File(filePath))); if
    (!PolicyService.allowIntent(intent)) {
        context.sendBroadcast(intent);
```

Developer may change the object with another sensitive operation after obtaining the correct permission: 510

```
public static void scanFile(Context context,
    String filePath) { Intent intent = new
    Intent("android. intent.action.SCAN FILE");
    intent.setData(Uri.fromFile(new
    File(filePath))); if
    (PolicyService.allowIntent(intent)) {
        intent.setData(Uri.fromFile(new
        File("/some/path")));
        context.sendBroadcast(intent);
```

*FIG. 5*

PERMISSION CHECKER FOR STATIC CODE ANALYSIS TOOL

BACKGROUND

Static code analysis is a technology for detecting security vulnerabilities and checking safety properties in the source code of computer programs. Computer programs often perform sensitive operations that have safety and security ramifications. Security vulnerabilities in computer program source code may be created during the code development phase. Source code including sensitive operations with credulous use of data from unsafe or untrustworthy sources may be written into the computer program. A goal of computer program coding is to establish explicit checks that such sensitive operations are safe and secure before performing the sensitive operations. Static code analysis tools are used to analyze computer program source code and ensure that sensitive operations are performed with data that has been checked for safety and/or sanitized. Taint analysis is a technique used in static code analysis that selects a set of untrustworthy sources, called taint sources, and a set of sensitive operations, called sinks, and checks the manner in which a sink uses data from a taint source in computer program source code. More particularly, taint analysis checks that the data from the taint source is either validated as safe via a call to a validator function or transformed into a safe form via a call to a taint sanitizing function, prior to a sink using the data. Static code analysis tools using taint analysis may be implemented based on the inter-procedural, finite, distributive subset (IFDS) framework. The IFDS framework is a dataflow analysis framework.

However, IFDS-based taint analyses do not track conditional path flow constructs, for example, "if . . . else" conditional statements when tracking data from sources to sinks along branching control flow paths in computer program source code. Consequently, a disproportionately high number of false positives may be reported based on the inclusion of infeasible control flow paths having incompatible path conditions. On the other hand, accurately tracking the possible variations of program state across the possible control flow paths may lead to exponential processor and memory usage at runtime. A challenge is to selectively track control flow path conditions directly affecting the data being propagated.

SUMMARY

In general, in one aspect, one or more embodiments relate to a method. The method includes obtaining a data flow graph of a computer program code. The computer program code includes a dataflow fact. The data flow graph has a data flow path corresponding to the dataflow fact. The method further includes augmenting the data flow graph by adding a correlation to the dataflow fact of the data flow graph according to an instruction type in the computer program code. An augmented data flow graph is obtained, having a first set of data flow paths corresponding to the dataflow fact. The method further includes merging a first data flow path and a second data flow path of the first set of data flow paths corresponding to the dataflow fact, to obtain a transformed data flow graph having a second set of data flow paths corresponding to the dataflow fact.

In general, in one aspect, one or more embodiments relate to a system. The system includes at least one computer processor, a graphical user interface (GUI), executing on the at least one computer processor, and a data repository, and a permissions checker, executing on the at least one computer processor. The permissions checker is configured to cause the at least one computer processor to perform operations including obtaining a data flow graph of a computer program code from the data repository, the computer program code including a dataflow fact, and the data flow graph having a data flow path corresponding to the dataflow fact. The permissions checker is further configured to cause the at least one computer processor to augment the data flow graph by adding a correlation to the dataflow fact of the data flow graph according to an instruction type in the computer program code. An augmented data flow graph is obtained, having a first set of data flow paths corresponding to the dataflow fact. The permissions checker is further configured to cause the at least one computer processor to merge a first data flow path and a second data flow path of the first set of data flow paths corresponding to the dataflow fact, to obtain a transformed data flow graph having a second set of data flow paths corresponding to the dataflow fact.

In general, in one aspect, one or more embodiments relate to a non-transitory computer readable medium. The non-transitory computer readable medium includes instructions executable by at least one computer processor to perform operations including obtaining a data flow graph of a computer program code, the computer program code including a dataflow fact, and the data flow graph having a data flow path corresponding to the dataflow fact. The operations further include augmenting the data flow graph by adding a correlation to the dataflow fact of the data flow graph according to an instruction type in the computer program code to obtain an augmented data flow graph. The augmented data flow graph includes a first set of data flow paths corresponding to the dataflow fact. The operations further include merging a first data flow path and a second data flow path of the first set of data flow paths corresponding to the dataflow fact, to obtain a transformed data flow graph having a second set of data flow paths corresponding to the dataflow fact.

Other aspects of one or more embodiments will be apparent from the following description and the appended claims.

BRIEF DESCRIPTION OF DRAWINGS

FIG. 5 shows examples of program code using proper and improper checking of dataflow facts from taint sources, in accordance with one or more embodiments.

Like elements in the various figures are denoted by like reference numerals for consistency.

DETAILED DESCRIPTION

One or more embodiments are directed to a permissions checker for a static code analysis system. The static code analysis system uses taint analysis to create data flow graphs for a software program code. Taint analysis models the transition of data from taint sources and sinks as a graph reachability problem, creating data flow graphs tracking data from taint sources as the data transitions through sinks. Taint sources are potentially tainted, or unsafe, data, modeled as nodes. Sinks are sensitive operations on the taint sources, modeled as edges.

The permissions checker augments the data flow graphs generated by taint analysis with correlations according to an instruction type in the computer program code. For example, the instruction type for which a corresponding correlation of a particular correlation type may be obtained includes conditional path branches, validator function summaries, and called function summaries. The permissions checker further creates additional exit facts in computer program code for called functions with return values based on local variables derived from taint sources. Furthermore, the permissions checker may perform summary refinement and specialization operations on the augmented data flow graph. The augmented data flow graph may be traversed from a function, or main program exit point to a function or main program entry point. If a taint source is directly reachable from a function or main program exit point with no intervening conditional path branch or called validator function safeguarding a sink operation, an error may be reported. If a source is not directly reachable from a sink on account of intervening path flow conditions or called validator functions, the source code may be passed as being safety compliant.

Figure 1:
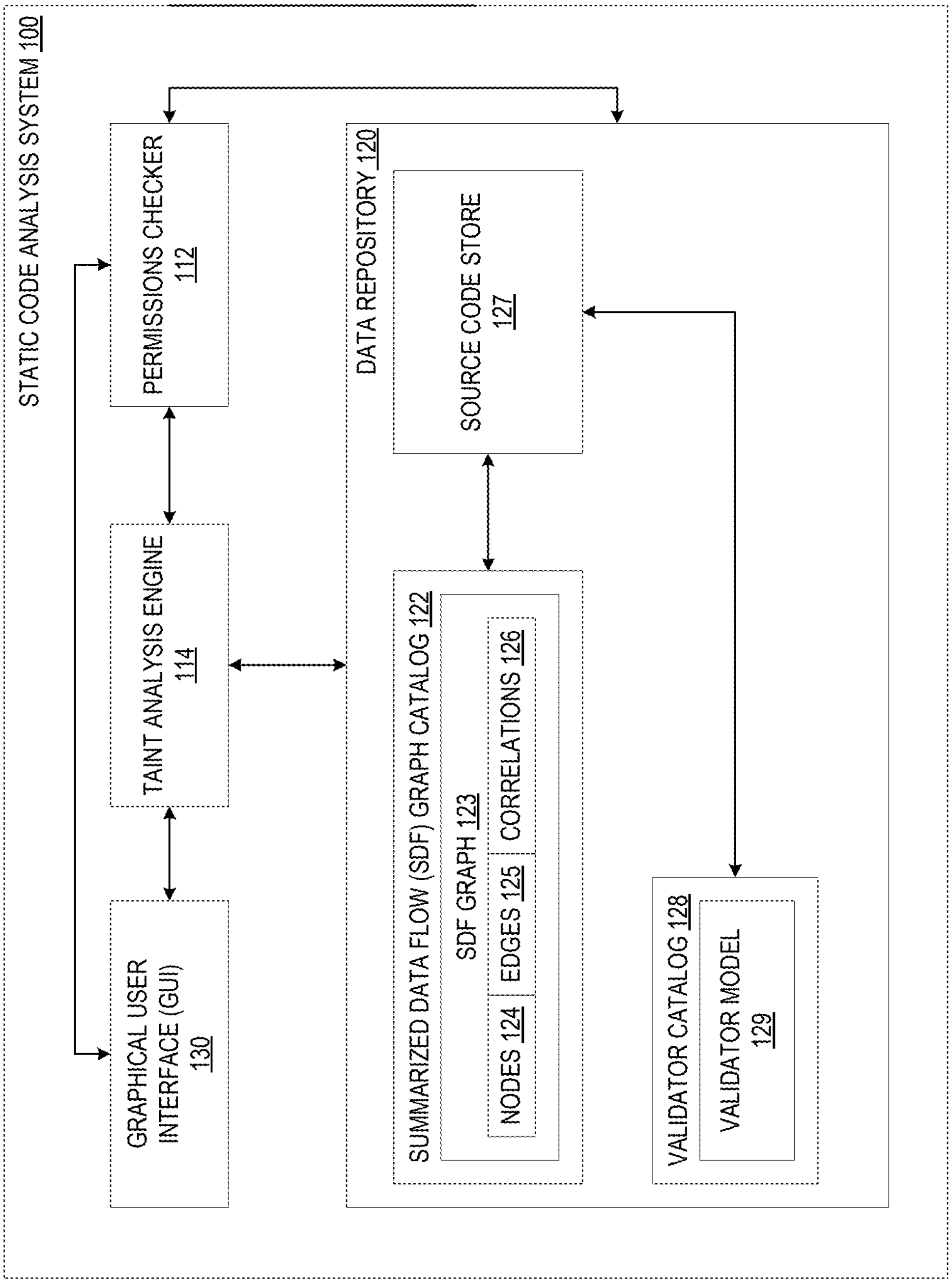
FIG. 1 shows a computing system, in accordance with one or more embodiments.

Attention is now turned to the figures. FIG. 1 shows a computing system, in accordance with one or more embodiments. The static code analysis system (100) is one or more computer processors, data repositories, communication devices, and supporting hardware and software. The static code analysis system (100) may be in a distributed computing environment. The static code analysis system (100) is configured to execute one or more applications, such as the taint analysis engine (114), the permissions checker (112) and a graphical user interface (GUI) (130). An example of a computer system and network that may form the static code analysis system (100) is described with respect to FIG. 9A and FIG. 9B. Each of these components is described herein. The static code analysis system (100) includes at least one computer processor. The at least one computer processor is one or more hardware or virtual processors which may execute computer readable program code that defines one or more applications, for example, the taint analysis engine (114), and the permissions checker (112). An example of the at least one computer processor is described with respect to the computer processor(s) (902) of FIG. 9A.

As used in the current specification, the terms "(unit of) computer program code" and "(unit of) computer program source code" are interchangeable and are used to refer to source code written in a programming language for a computer program. The computer program code may include a main program source code. The computer program code may further include a function source code. In other words, the terms "(unit of) computer program code" and "(unit of) computer program source code" may refer to a unit of source code that is a function. Additionally, or alternatively, the terms "(unit of) computer program code" and "(unit of) computer program source code" may refer to a unit of source code that is the main program of the computer software. Main program source code may be identified across several diverse programming languages with a function name "main" followed by "{ }" parentheses enclosing the source code of the main program, or variations thereof. The identifier "main" identifies the starting point of execution of a computer program. In a similar manner, function source code may be identified across several diverse programming languages with a particular function name (e.g., "IsPermissionValid," "VerifyDataSource" etc.) followed by "( )" parentheses enclosing one or more function parameters and thereafter, by "{ }" parentheses enclosing the source code of the particular function, or variations thereof. Function source code may include function calls to other functions, or to the self-same function (e.g., recursive functions). In a similar manner, main computer program source code may include one or more function calls to other functions.

The system shown in FIG. 1 includes a data repository (120). The data repository (120) is a type of physical storage unit or physical storage device for storing data. Data may be stored on the physical storage unit, physical storage device, or any other storage mechanism. Data may be stored in the form of logical storage systems, e.g., a file system, database, data structure, or any other logical storage structure. The data repository (120) may include multiple different, potentially heterogeneous, physical storage units and/or physical storage devices.

The data repository (120) includes a source code store (127). The source code store (127) may include source code pertaining to diverse computer application products, support applications, cloud-based applications, etc. The source code store (127) may further include source code pertaining to database applications, database systems, etc. Source code is computer program source code. For example, a computer program may be written in a programming language such as Python®, Java®, C®, C++®, etc., in one or more files. The files store the source code of the computer program. The files including the source code may be stored in the source code store (127).

The data repository (120) further includes a summarized data flow (SDF) graph catalog (122). The SDF graph catalog (122) includes at least one SDF graph (123). The SDF graph (123) is a data structure that stores data flow graphs of computer program code, for example, data flow graphs of a main program, data flow graphs of functions, etc. An example of a data structure that stores data flow graphs is an adjacency list. A data flow graph may include multiple nodes (124), multiple edges (125), and multiple correlations (126). The multiple nodes (124), edges (125), and correlations (126) may be arranged in one or more data flow paths of the SDF graph (123). A node (124) of a data flow path corresponds to a dataflow fact. The dataflow fact corresponds to a data variable or object that may be obtained from a potentially tainted source. An edge (125) of the data flow path corresponds to an instruction operating on the dataflow fact.

A correlation (126) of the data flow path is a correlation (126) corresponding to a dataflow fact. As a general overview, a correlation (126) characterizes the relationship between a property of the dataflow fact and a control flow path of the computer program code that affects the dataflow fact. The relationship may be characterized as positive or negative. Thus, a correlation may likewise, be positive or negative. Further, a correlation has a correlation type that matches the instruction type of one or more instructions in the computer program code. For example, a correlation may be a conditional path correlation that characterizes the relationship between a property of the dataflow fact and a conditional path branch. In another example, a correlation may be a validator function correlation that characterizes the relationship between a property of the dataflow fact and a validator function, when processed by a validator function. Validator functions may check the safety of the dataflow fact for use in sensitive operations (sinks). In another example, a correlation may be a called function correlation that characterizes the relationship between a property of the dataflow fact and a called function, when processed by the called function.

Figure 6:
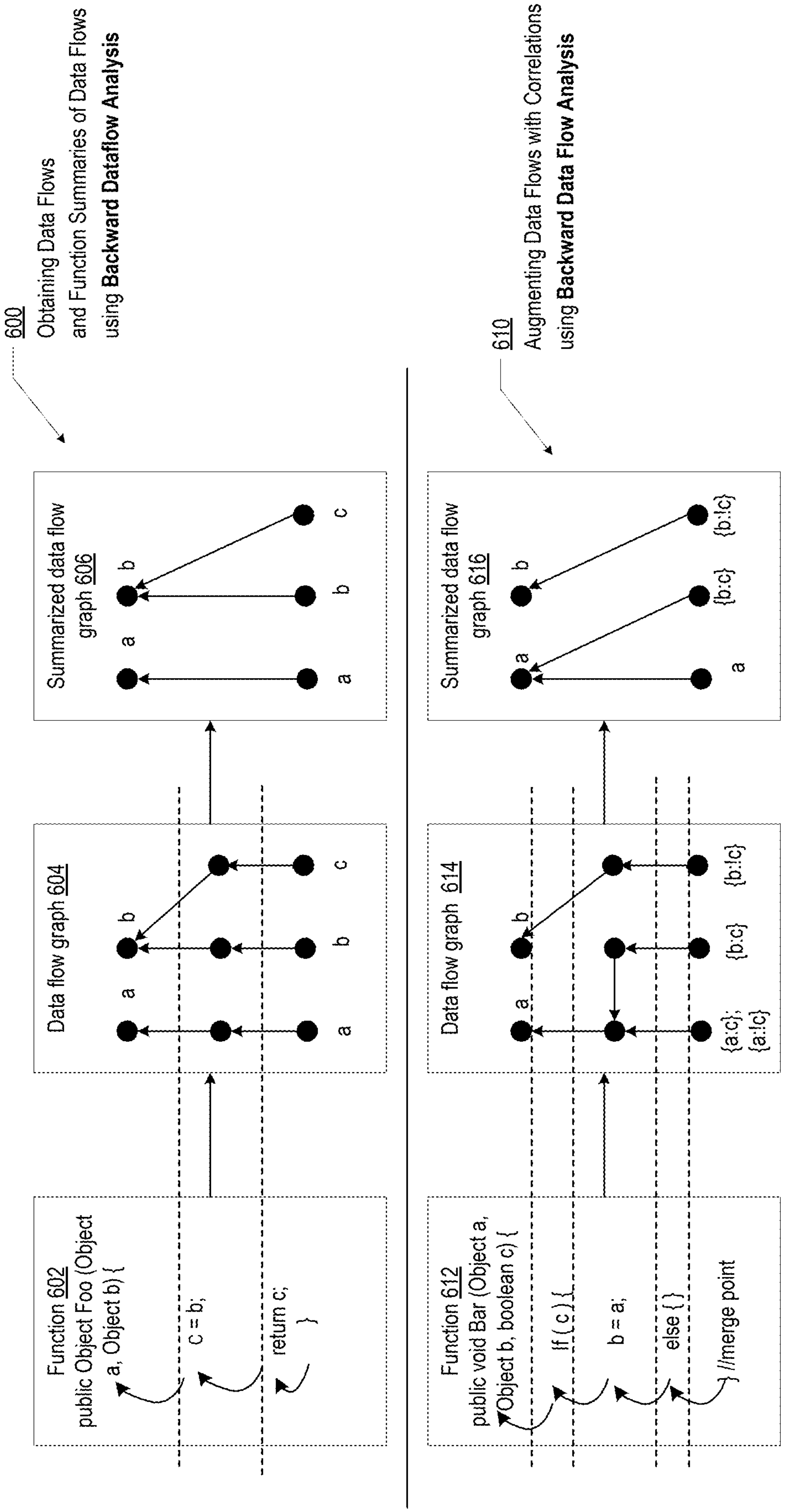
FIG. 6 shows an example of a workflow for obtaining data flows of taint sources and sinks in a function, in accordance with one or more embodiments.

Thus, multiple data flow paths of multiple dataflow facts constitute an SDF graph (123) corresponding to a computer program code of a main program or a function. An example of creating a data flow graph for a function with multiple dataflow facts is shown in FIG. 6. Creating the data flow graph is described in detail in reference to FIG. 6.

The data repository (120) further includes a validator catalog (128). The validator catalog (128) is a data structure that stores SDF graphs (123) of validator functions. The SDF graphs (123) of validator functions are referred to as validator models (129). In one or more embodiments, the validator models (129) may be data flow graphs including nodes (124), edges (125), and correlations (126). The validator model (129) is described in further detail in reference to FIG. 6.

The static code analysis system (100) includes a taint analysis engine (114). The taint analysis engine (114) is a collection of computer programs and code, configured to generate data flow graphs of computer program source code. The taint analysis engine (114) may be configured to parse one or more programming languages used to write the computer program source code and recognize diverse control flow paths in the computer program source code. Further, the taint analysis engine (114) may be configured to recognize sensitive operations (sinks) on data obtained from potentially tainted sources. For example, the taint analysis engine (114) may be configured to recognize functions or object methods obtaining data from sources external to an enterprise network or data repository. In a similar manner, the taint analysis engine (114) may be configured to recognize sensitive operations (sinks) that may inject data, or broadcast data further into an enterprise network or into enterprise data repositories. In one or more embodiments, the taint analysis engine (114) may include a graph generation component that generates data flow graphs for computer program code. As shown in FIG. 1, the taint analysis engine (114) is operably and communicably coupled to the permissions checker (112), and the GUI (130). Other architectural arrangements may be possible. Some examples of available taint analysis tools include FlowDroid®, Facebook Infer®, etc. In one or more embodiments, the taint analysis engine (114) may be a customized variation of such an off-the-shelf tool.

The permissions checker (112) of the static code analysis system (100) is a collection of computer programs and code that is configured to augment data flow graphs of computer program code with correlations corresponding to dataflow facts of the computer program code. The permissions checker (112) is configured to recognize conditional path branches that affect dataflow facts from potentially tainted sources and add correlations to the dataflow facts that characterize the conditional path branches. Further, the permissions checker (112) is configured to recognize validator functions, and sanitizer functions that verify or sanitize a dataflow fact for safe use within the computer program code. The permissions checker (112) may add correlations characterizing the validator functions and/or sanitizer functions to the dataflow facts affected by the validator and/or sanitizer functions. Additional features of the permissions checker (112) are described in detail in reference to the flowcharts and examples.

The graphical user interface (GUI) (130) of the static code analysis system (100) includes one or more graphical artifacts (for example, source code windows, checkboxes, buttons, etc.), configured to display source code sections to a user of the static code analysis system (100). The graphical artifacts may include at least one widget that presents results from the static code analysis system (100). For example, the widget may present a section of source code similar in appearance to Blocks 504-510 of FIG. 5, highlighting a sensitive operation that is not safeguarded by conditional path branches or validator functions.

While FIG. 1 shows a configuration of components, other configurations may be used without departing from the scope of one or more embodiments. For example, various components may be combined to create a single component. As another example, the functionality performed by a single component may be performed by two or more components.

Some terms as used in the current specification are described herein. The terms may be used in describing the flowcharts shown in FIGS. 2, 3, 4A, and 4B, and the examples shown in FIGS. 6, 7, and 8. In taint analysis, each instruction of a computer program code has an associated "flow function" that describes how data "facts" propagate across the execution of the instruction. A data "fact" is a tainted value in the computer program code that originates from a tainted source. The data "fact" is referred to in the current specification as a "dataflow fact." Taint analysis starts at a function, or program codes exit instructions and propagates each dataflow fact backward until it reaches the function entry point, applying each instruction operating on the dataflow fact along the way. The dataflow fact at the exit point of the function or computer program code is referred to as a dataflow exit fact. A dataflow fact that reaches the function or computer program code entry point is referred to as a dataflow entry fact.

In taint analysis, the propagation of a dataflow fact backwards through a function or computer program code generates a data flow path for the dataflow fact. Multiple data flow paths may be generated, corresponding to multiple dataflow facts. The set of data flow paths generated for multiple dataflow facts of a function or computer program code may constitute a data flow graph corresponding to the function or computer program code. A summarized data flow graph is a data flow graph including summarized data flow paths. A summarized data flow path has intermediate dataflow facts removed, keeping only the dataflow exit fact and the dataflow entry fact. A summarized data flow graph of a function is a function summary. Function summaries may be stored in the SDF graph catalog in the data repository.

A data flow path may include nodes and edges. A first node of a data flow path may correspond to a dataflow exit fact. A first edge of the data flow path may correspond to an instruction of the computer program code or function that acts on the dataflow exit fact previously to the exit point of the computer program code or function. A next node of the data flow path may correspond to the dataflow fact connected to the first edge, and may be representative of the dataflow fact previous to the instruction corresponding to the first edge acting on the dataflow fact. An example of a data flow path construction may be found in FIG. 6. The example is described in detail in reference to FIG. 6. As described previously, a correlation characterizes a conditional path, or validator function, or called function effect on a dataflow fact. A conditional path correlation characterizes a property of the dataflow fact with a positive or negative correlation to the conditional path branch. For example, if a conditional path branch is based on a true value of a Boolean variable c, then a dataflow fact a directly affected by the true branch may have a correlation of the form {a:c}, which is read as: "a property of a is positively correlated with c." In a similar manner, a validator function correlation correlates a property of the dataflow fact with a positive or negative correlation to the result of the validator function. Likewise, a called function correlation correlates a property of the dataflow fact with a positive or negative correlation to the result of the called function. The return values of validator functions and called functions may be referred to as function exit facts. In taint analysis, the property of the dataflow fact that is characterized in the correlation is the "taintedness" of the dataflow fact, that is, the fact that the dataflow fact originates from an untrustworthy source.

Figure 2:
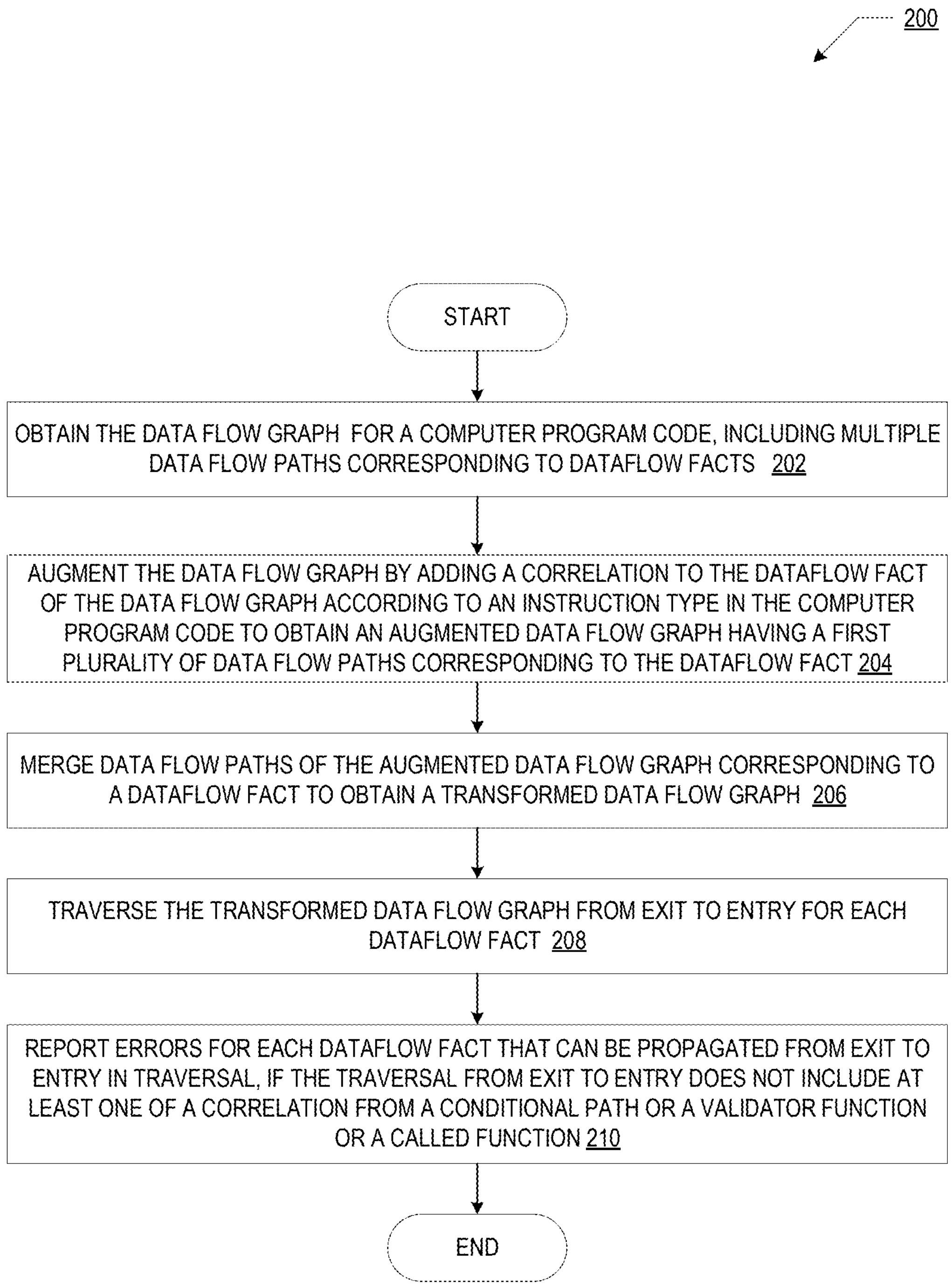
FIG. 2 shows a flowchart, in accordance with one or more embodiments.

FIG. 2 shows a flowchart (200) of a method for performing taint analysis of a unit of computer program source code using a permissions checker, in accordance with one or more embodiments. The method of FIG. 2 may be implemented using the system of FIG. 1 and one or more of the steps may be performed on or received at one or more computer processors. While the various steps in this flowchart are presented and described sequentially, at least some of the steps may be executed in different orders, may be combined, or omitted, and at least some of the steps may be executed in parallel. Furthermore, the steps may be performed actively or passively.

In Block 202, the data flow graph for a unit of computer program code, including multiple data flow paths corresponding to dataflow facts is obtained. In one or more embodiments, the data flow graph for the computer program code may be obtained by the permissions checker. In one or more embodiments, the unit of computer program code may include a dataflow fact, and the data flow graph may have a data flow path corresponding to the dataflow fact.

In one or more embodiments, the taint analysis engine may generate a data flow graph for the unit of computer program code. The data flow graph may include multiple data flow paths, corresponding to dataflow facts of the unit of computer program code. An example of a data flow graph generated by the taint analysis engine is shown in FIG. 6. A data flow path may include multiple nodes and edges. A node may represent a dataflow fact. An edge may represent an instruction in the unit of computer program code that operates on the dataflow fact. The instruction may be a programming language instruction. Alternatively, the instruction may be a function call that operates on the dataflow fact.

In one or more embodiments, the taint analysis engine may generate data flow paths for the dataflow facts of the unit of computer program code by a backward dataflow analysis technique. As a general overview, the taint analysis engine performs a backward data flow analysis of the unit of computer program code. The taint analysis engine may generate data flow paths corresponding to dataflow facts. The taint analysis engine may propagate the dataflow facts backwards through the unit of computer program code. Further, the taint analysis engine may add nodes and edges corresponding to dataflow facts and instructions for each step of the backward propagation until the entry point of the unit of computer program code is reached. Multiple data flow paths may be generated in the backward data flow analysis, corresponding to each dataflow fact that can be propagated back to the entry point of the unit of computer program code.

More particularly, the taint analysis engine may start at the exit point of the unit of computer program code and identify at least one dataflow exit fact in the unit of computer program code. As previously described, a dataflow fact that persists at a function exit point is a dataflow exit fact. Further, the taint analysis engine may generate a data flow path corresponding to the dataflow exit fact by propagating the dataflow exit fact backward through the unit of computer program code. The dataflow exit fact at intermediate stages of the unit of computer program code is simply referred to as a dataflow fact. Thus, the taint analysis engine may propagate the dataflow fact backwards through the unit of computer program code until an entry point of the unit of computer program code is reached. A dataflow fact that reaches the entry point of the unit of computer program code is referred to as a dataflow entry fact. In propagating the dataflow fact backwards, the taint analysis engine may generate a data flow path corresponding to the dataflow exit fact by adding a node corresponding to the dataflow exit fact to the data flow path. The taint analysis engine may further add an edge corresponding to an instruction in the unit of computer program code operating on the dataflow exit fact to the data flow path. This step is performed if the instruction is an instruction in the source code programming language, for example, an assignment statement, an iterative loop, or any operation on the dataflow entry fact.

However, if the instruction is a function call, a function data flow graph of the function called in the instruction may be obtained. In one or more embodiments, the taint analysis engine may create a call graph of all the function calls in the unit of computer program code. The taint analysis engine may repeat this step within the functions of the call graph, creating further call graphs within the functions of the call graph for called functions. This process may continue, with the taint analysis engine traversing down a "function chain" of called functions until a furthest function which does not call further functions is reached. The data flow graph for the furthest function, the "leaf node" function in the function chain may be generated.

The taint analysis engine may traverse backwards from the leaf node functions up the function chain, creating data flow graphs for the callers of the leaf node functions, then the data flow graphs for the callers of the callers, etc., until data flow graphs are created for all the functions. The function data flow graphs generated for each of the functions may be "summarized" by removing intermediate dataflow facts (or nodes), preserving the dataflow entry nodes and dataflow exit nodes. The summarized data flow (SDF) graph is referred to as a function summary. The SDF graph, or function summary, may further be stored in a function summary catalog. Function summaries may be applied at any call site targeting the respective functions, avoiding having to repeat analyzing the function. An example showing the generation of a data flow graph and SDF graph for a function in a unit of computer program code is described in further detail in reference to FIG. 6.

In Block 204, the data flow graph is augmented by adding a correlation to the dataflow fact of the data flow graph according to an instruction type in the unit of computer program code to obtain an augmented data flow graph having a first set of data flow paths corresponding to the dataflow fact. For example, one or more of the correlations that are used to augment the data flow graph may be a conditional path correlation, a validator function correlation, and a called function correlation. Other correlations may be additionally or alternatively used to augment the data flow graph without departing from the scope of the claims.

For example, conditional path correlations may be added to the data flow paths of the data flow graph corresponding to conditional path branches affecting the dataflow facts. In one or more embodiments, a conditional path correlation may be added to the dataflow fact of the data flow graph corresponding to a conditional path branch of the unit of computer program code. More particularly, the conditional path branch of the unit of computer program code affecting the dataflow fact may be identified. Further, the conditional path correlation for the dataflow fact based on the conditional path branch value may be generated. The conditional path correlation may be added to the dataflow fact. For example, if in a true branch of a control flow path, a sensitive operation, or sink, is performed on the dataflow fact, then the correlation is added to the node representing the dataflow fact in the corresponding data flow path of the data flow graph. On the other hand, if in a true or a false branch of a control flow path, no sensitive operation is performed on the dataflow fact, then the correlation for that control flow path is not added to the node representing the dataflow fact.

For example, a dataflow exit fact b may be shown with two correlations, namely {b:c} and {b:!c}. In taint analysis, the notation {b:c} denotes that a property of b, namely, the taintedness of b is positively correlated with c. Similarly, the notation {b:!c} denotes that the taintedness of b is negatively correlated with c.

As another example, validator function correlations may be added to data flow paths of the data flow graph corresponding to validator function calls on the dataflow facts. In one or more embodiments, a validator function correlation may be added to the dataflow fact of the data flow graph corresponding to a validator function of the unit of computer program code operating on the dataflow fact. More particularly, a validator function summary may be applied to the dataflow fact. The validator function summary (validator model) may correspond to the validator function of the unit of computer program code operating on the dataflow fact. The validator function correlation may be obtained from the validator function summary. The validator function correlation may be added to the dataflow fact. In one or more embodiments, the permissions checker may recognize the validator function in the unit of computer program code and obtain the corresponding validator model from the validator catalog in the data repository.

Validator functions perform checking the safety of potentially tainted dataflow facts from a taint source. In one or more embodiments, validator functions may be modeled by the permissions checker as SDF graphs denoting the return value of the function as false if the dataflow fact was tainted prior to the function call, and true, if the dataflow fact was untainted prior to the function call. Thus, when applying the SDF graph, or function summary, of a validator function at a validator function call site in the unit of computer program code, the validator function return value(s), or exit fact(s), may be added to a dataflow fact as (a) correlation(s). An example of adding a validator function correlation to a dataflow fact is shown and described in detail in reference to FIG. 7. Further, an example of modeling a validator function by the permissions checker is shown in reference to FIG. 7.

As another example, called function correlations may be added to the data flow paths of the data flow graph corresponding to called functions operating on the dataflow facts to obtain an augmented data flow graph. In one or more embodiments, a called function correlation may be added to the dataflow fact of the data flow graph corresponding to a called function of the unit of computer program code operating on the dataflow fact. More particularly, a called function summary corresponding to the called function of the unit of computer program code operating on the dataflow fact may be applied to obtain the called function correlation. Further, the called function correlation may be added to the dataflow fact. The operation of Block 204 may result in obtaining an augmented data flow graph having a first set of data flow paths corresponding to the dataflow fact.

In a similar manner to validator functions, when an SDF graph, or a function summary, corresponding to a called function is applied at the called function call site in the unit of computer program code, the called function return value, or exit fact(s) may be added to a dataflow fact as a correlation. Additionally, the called function exit fact may be added to the dataflow fact at the exit point of the unit of computer program code. In other words, the called function return value or exit fact may be additionally added to the dataflow exit fact of the data flow path corresponding to the dataflow fact. An example of adding a called function exit fact to a dataflow fact and further, adding the called function exit fact to the unit of computer program code exit point is described in detail in reference to FIG. 7.

In certain cases, the called function may return the result of a validator function performed on a local variable within the called function. The local variable may in turn be derived from a potentially tainted dataflow entry fact of the called function. In this situation, the permissions checker may create a new dataflow exit fact for the called function, corresponding to the local variable, and further, a data flow path for the local variable that is summarized in the SDF graph for the called function. Since the local variable is not visible outside the context of the called function, a summary refinement operation may be performed on the data flow path for the local variable, such as described below in reference to FIG. 4.

If the unit of computer program code does not include any instruction for which to generate a correlation, then control may pass to Block 208.

In Block 206, the data flow paths of the augmented data flow graph corresponding to a dataflow fact are merged to obtain a transformed data flow graph. In one or more embodiments, a first data flow path and a second data flow path of the first set of data flow paths corresponding to the dataflow fact, may be merged to obtain a transformed data flow graph having a second set of data flow paths corresponding to the dataflow fact. A transformed data flow graph may be obtained from the operations performed in Block 206.

In Block 208, the transformed data flow graph is traversed from exit to entry for each dataflow fact. In one or more embodiments, a data flow path from the second set of data flow paths corresponding to the dataflow fact may be selected to obtain a candidate data flow path. The candidate data flow path may include an exit node corresponding to the dataflow fact at an exit point of the unit of computer program code, and an entry node corresponding to the dataflow fact at an entry point of the unit of computer program code. The candidate data flow path may be traversed from the exit node to the entry node.

In the traversal, the dataflow fact may be propagated backwards up the candidate data flow path of the data flow graph. If the dataflow fact can be propagated backwards from exit to entry, then the entry may be considered to be reachable from the exit of the unit of computer program code. The reachability of the entry from the exit may indicate that a potentially tainted dataflow fact from a taint source may be used in one or more sensitive operations (sink) which are not safeguarded by a conditional path flow branch, or a validator function.

If the data flow graph of the unit of computer program code is not augmented and/or transformed, the original data flow graph of the unit of computer program code may be traversed from exit to entry for the dataflow facts.

In Block 210, errors may be reported for each dataflow fact that can be propagated from exit to entry in traversal if the traversal from exit to entry does not include at least one of a correlation from a path condition or a validator function or a called function. In one or more embodiments, an error may be reported, responsive to the entry node being reachable from the exit node in traversing the candidate data flow path. More particularly, the error may indicate that a direct path from exit to entry of the unit of computer program code for a potentially tainted dataflow fact is traversable, without safeguards of conditional path flows or validator functions programmed into the source code. On the other hand, the entry not being reachable from the exit node in traversing the candidate data flow path may indicate that the potentially tainted dataflow fact is safeguarded by conditional path flows or validator functions, and the source code thus passes the taint analysis.

Figure 3:
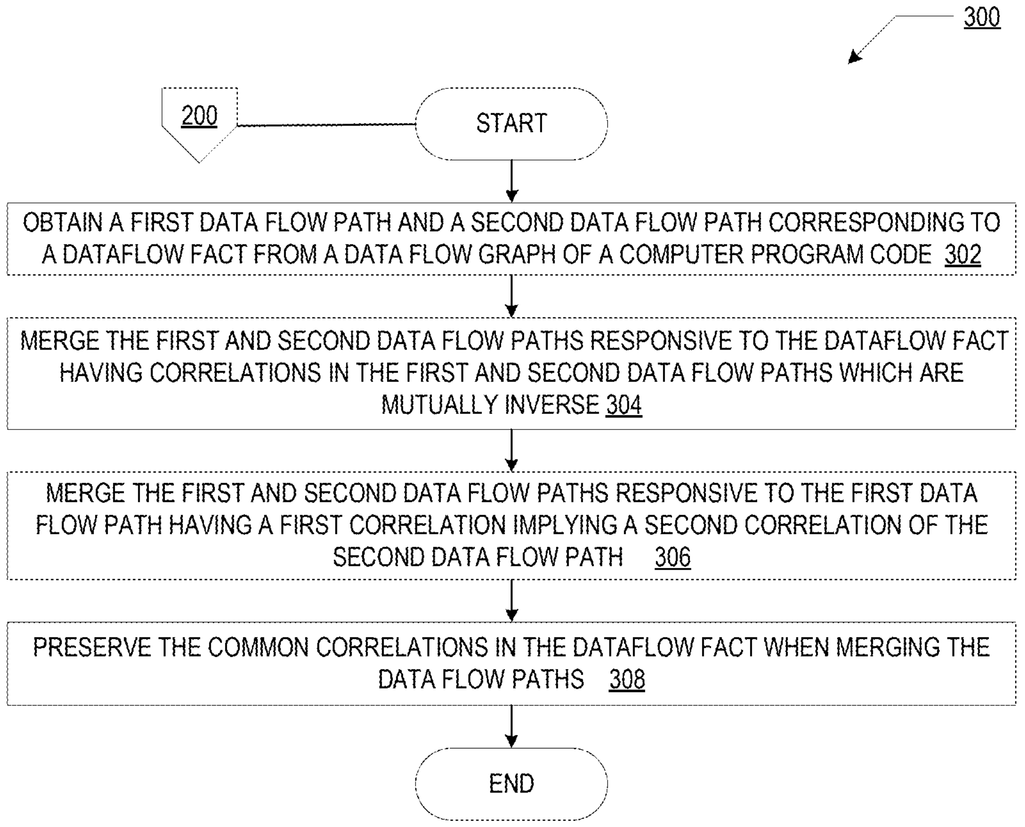
FIG. 3 shows a flowchart, in accordance with one or more embodiments.

FIG. 3 shows a flowchart 300 for resolving correlations, validator function exit facts, and called function exit facts. The operations of FIG. 3 is an example of Block 206 of FIG. 2.

As described in reference to FIG. 2, validator function exit facts and called function exit facts may be added to dataflow facts in a calling function or the unit of computer program code as correlations. For example, if, in the unit of computer program code, a function isPermissionValid is called, which returns a Boolean value of true for an untainted input parameter, and the input parameter to isPermissionValid is a potentially tainted dataflow fact, for example, an object of the Android® class Intent, then the exit fact, or return value, of isPermissionValid is added to the dataflow fact for intent (an instance of class Intent) as {intent: isPermissionValid( )}.

Accordingly, resolving correlations in a function or in unit of computer program code may entail resolving correlations corresponding to conditional path branches, or validator function calls, or called functions.

The flowchart 300 starts at Block 302. In Block 302, a first data flow path and a second data flow path corresponding to a dataflow fact from a data flow graph of a unit of computer program code are obtained.

In Block 304, the first and second data flow paths are merged, responsive to the dataflow fact having correlations in the first and second data flow paths which are mutually inverse. For example, if the dataflow fact in the first data flow path, at the unit of computer program code exit point has the correlation {a: (policyService!=null)}, and the dataflow fact in the second data flow path, at the program code exit point has the correlation {a: !(policyService!=null), then the two correlations for a are mutually inverse. Hence the first and second data flow paths may be merged. In one or more embodiments, the first data flow path and the second data flow path may be merged responsive to the first data flow path having a first correlation of the dataflow fact that is mutually inverse to a second correlation of the dataflow fact in the second data flow path. Resultingly, a merged data flow path may be obtained. Further, the first correlation and the second correlation may be removed from the dataflow fact in the merged data flow path. Continuing with the same example, in the merged data flow path, at the program code exit point, the dataflow fact for a may be {a}, with the inverse correlations being removed.

In Block 306, another type of correlation may be merged. More particularly, the first and second data flow paths may be merged responsive to the first data flow path having a first correlation implying a second correlation of the second data flow path. By way of example, if dataflow fact a has the correlations in the first data flow path {a:!c; (policyService!=null)}, where c is a Boolean value which is used in a conditional path branch in the unit of computer program code, and the correlation in the second data flow path {a:(policyService!=null)}. Notably, there is no corresponding correlation to c for a in the second data flow path. The permissions checker interprets the absence of the corresponding correlation to c as a more general correlation encompassing both true and false values of c. In other words, the permissions checker may interpret the second correlation for a in the second data flow path as {a:!c; c; (policyService!=null)}. The interpretation of the second correlation with respect to c as a generalized version of the first correlation of c, both with respect to dataflow fact a, causes the permissions checker to merge the first and second data flow paths. The correlation for c may be removed from the merged data flow path. The resulting correlation for dataflow fact a in the merged data flow path is {a: (policyService!=null)}.

Accordingly, in one or more embodiments, the first data flow path and the second data flow path may be merged responsive to the first data flow path having the first correlation of the dataflow fact that implies the second correlation of the dataflow fact in the second data flow path. A merged data flow path may be obtained. Further, the first correlation and the second correlation may be removed from the dataflow fact in the merged data flow path.

Block 308 handles the case of common correlations in the first and second data flow paths. By way of the previous example, the common correlation for dataflow fact a in the first and second data flow path is (policyService!=null). In Block 308, the common correlations in the dataflow fact are preserved when merging the data flow paths. In one or more embodiments, a common correlation of the dataflow fact from the first data flow path and the second data flow path may be preserved in the merged data flow path. Thus, in the merged data flow path for dataflow fact a, a may have the correlation {a: policyService!=null)}.

Figure 4:
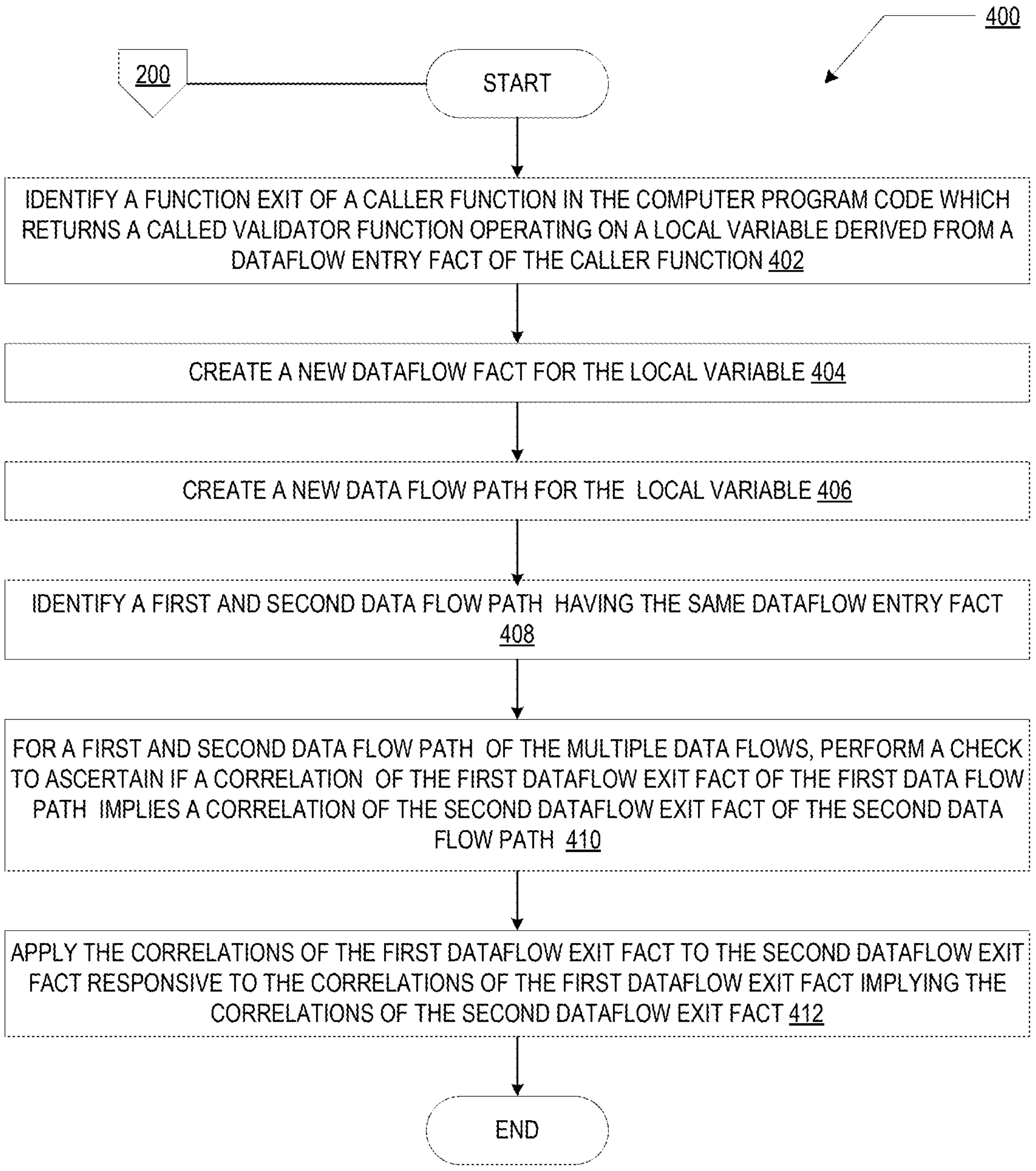
FIG. 4 shows a flowchart, in accordance with one or more embodiments.

FIG. 4 shows a flowchart 400 for creating caller exit facts and summary refinements in caller functions in which a local variable derived from a dataflow entry fact of the caller function may be validated by a validator function. Further, the validator function exit fact may be returned as the caller function exit fact. In one or more embodiments, the steps of flowchart 400 may be performed in Block 204 of flowchart 200.

Figure 8:
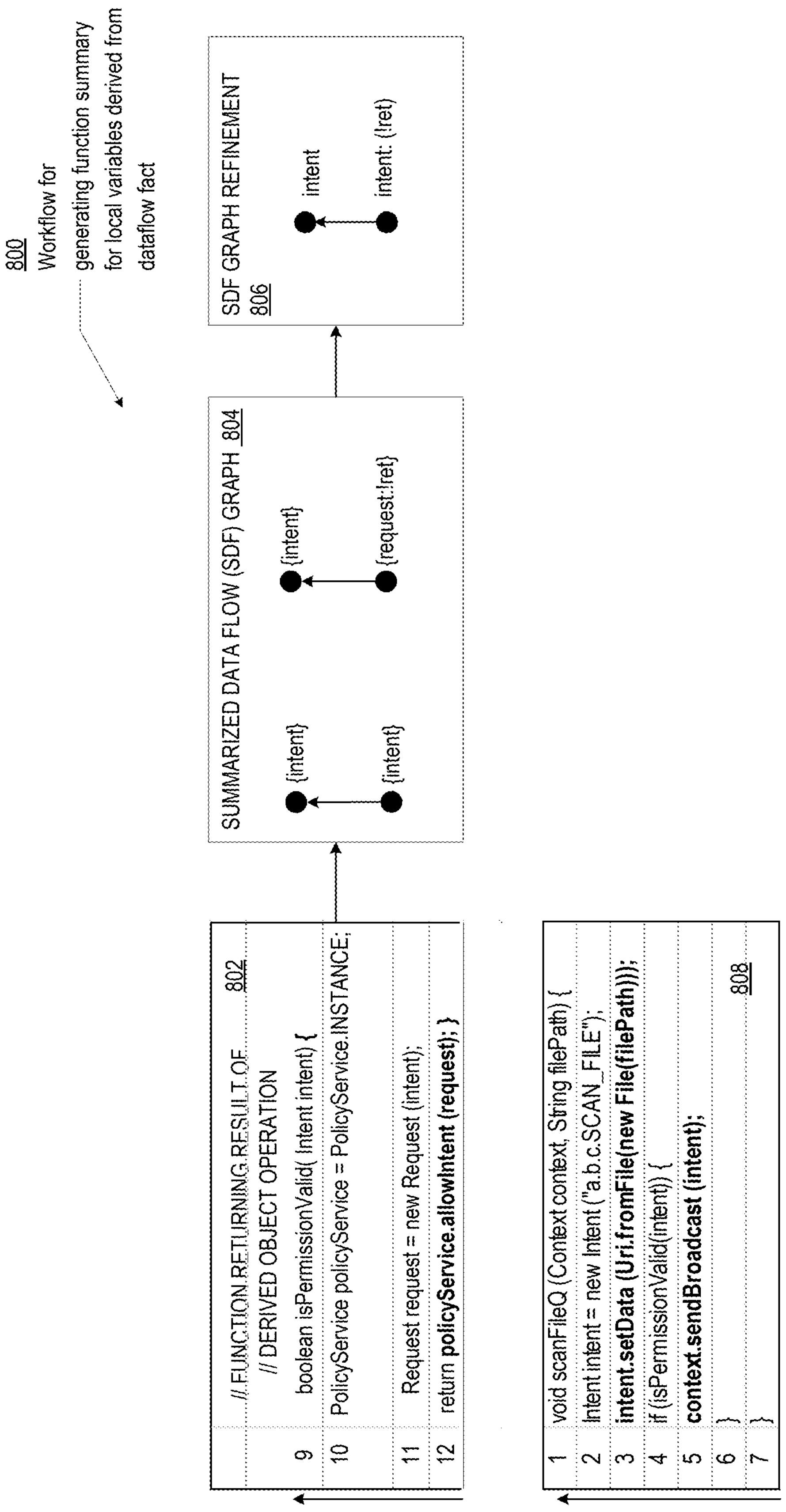
FIG. 8 shows an example of a workflow for creating a summarized data flow graph for a derived object in a computer program code, in accordance with one or more embodiments.

In Block 402 of the flowchart 400, a function exit of a caller function in the unit of computer program code is identified, which returns a local validator function operating on a local variable derived from a dataflow entry fact of the caller function. An example of a called function returning a local variable derived from a dataflow fact that is potentially tainted is shown in FIG. 8., Block 802. The example is described in detail in reference to FIG. 8. In one or more embodiments, a caller function exit point of a caller function in the unit of computer program code returning a local validator function operating on a local variable of the caller function may be identified. The local variable may be derived from a dataflow entry fact of the caller function.

On account of the local variable being derived from the dataflow entry fact, the local variable potentially may be tainted. Accordingly, in Block 404, a new dataflow fact is created for the local variable. In one or more embodiments, a new dataflow fact may be generated for the local variable in the caller function.

In Block 406, a new data flow path is created for the local variable. In one or more embodiments, a new data flow path for the local variable may be generated in the caller function. Further, the new data flow path may be added to a data flow graph of the caller function. An example of a local variable and a corresponding new data flow path is shown in FIG. 8, Block 804. The example is described in detail in reference to FIG. 8. The generation of the new dataflow fact and the new data flow path of the local variable results in the creation of a new exit fact of the caller function. The new exit fact is referred to as a "caller exit fact."

Blocks 408-412 of the flowchart 400 include the steps of performing a summary refinement operation. Caller exit fact creation as an operation creates an SDF graph, or function summary, for a local variable in the caller function. The function summary of the local variable may not be utilizable beyond the execution boundary of the caller function. Hence, a summary refinement operation is performed, to merge the data flow path of the local variable with a dataflow exit fact of the caller function.

Accordingly, in Block 408, a first caller function data flow path and a second caller function data flow path having the same dataflow entry fact are identified. In one or more embodiments, the first caller function data flow path and the second caller function data flow path may be identified from the caller function data flow graph.

In Block 410, a check is performed for the first and second caller function data flow paths to ascertain if a correlation of the dataflow exit fact of the first caller function data flow path implies a correlation of the second dataflow exit fact of the second caller function data flow path. In one or more embodiments, a first correlation of a first dataflow exit fact of the first caller function data flow path may be obtained. Further, a second correlation of a second dataflow exit fact of the second caller function data flow path may be obtained. The first correlation and the second correlation may be compared to ascertain if the first correlation implies the second correlation. More particularly, if the first correlation is more specific than the second correlation, then the first correlation may imply the second correlation. An example of a first correlation implying a second correlation is shown in FIG. 8.

In Block 412, the correlations of the first dataflow exit fact are applied to the second dataflow exit fact responsive to the correlations of the first dataflow exit fact implying the correlations of the second dataflow exit fact. In one or more embodiments, responsive to the first correlation implying the second correlation, the first correlation of the first dataflow exit fact may be added to the second dataflow exit fact. Further, the second correlation may be removed from the second dataflow exit fact.

An example of a summary refinement operation performed on a first and second data flow path having the same dataflow entry fact is shown and described in reference to FIG. 8.

FIG. 5 shows examples of program code using proper and improper checking of dataflow facts from taint sources. In Block 502, the function context.sendBroadcast is a sensitive operation. The function receives an intent object that tries to read information from the device's filesystem. The program code correctly checks whether such an operation is allowed by requesting permission from the object PolicyService. The result of the call to the method PolicyService.allowIntent guards the sensitive operation so that the operation is only performed when it is safe to do so.

Block 504 shows the program code snippet from Block 502, modified to show how a developer may fail to obtain the correct permission. As shown in Block 504, the call to context.sendBroadcast is not enclosed within a conditional path branch that checks PolicyService.allowIntent.

Block 506 shows the program code snippet from Block 502, modified to show how a developer may obtain the wrong permission. As shown in Block 506, the method invoked for PolicyService is allowJsonObjectRequest, operating on a new object type, JsonObjectRequest. Since this function does not safeguard intent, the call to context.sendBroadcast (intent) is not safeguarded.

Block 508 shows the program code snippet from Block 502, modified to show how a developer may invert the permission. As shown in Block 508, the check for the return value of PolicyService.allowIntent is inverted (!policyService.allowIntent). Thus, the sensitive operation may be performed specifically when intent is known not to be safeguarded.

Block 510 shows the program code snippet from Block 502, modified to show how a developer may change the object (intent) with another sensitive operation after obtaining the correct permission. As shown in Block 510, after PolicyService.allowIntent(intent) is invoked, the object intent is changed again in the method setData, subsequent to which the sensitive operation context.sendBroadcast is performed.

FIG. 6 shows an example of a workflow 600 for obtaining data flows and function summaries of data flows using backward dataflow analysis, in accordance with one or more embodiments. The following example is for explanatory purposes only and is not intended to limit the scope of one or more embodiments. In one or more embodiments, the workflow of FIG. 6 may be implemented using the system of FIG. 1.

The workflow 600 starts at Block 602. In one or more embodiments, the taint analysis engine performs a backward dataflow analysis. The analysis starts at the function exit instructions of the function "Foo," and propagates each dataflow fact backward until it reaches the function entry point, applying each instruction's respective flow function. Accordingly, the taint analysis engine may propagate each of three dataflow exit facts, (a, b, and c) backward, until the entry point of the function "Foo" is reached.

Dataflow exit facts a and b, are the function parameters of type Object passed to function "Foo." Dataflow exit fact c is the return value of type Object returned by function "Foo." A dataflow fact that reaches the function entry point is called a dataflow entry fact. Thus, Block 604 shows dataflow exit fact a, corresponding to the exit point of the function "Foo". At one step backward, namely at the instruction c=b, the dataflow exit fact a is not modified, therefore, the corresponding state of a remains unchanged. At the next step backward, dataflow exit fact a is propagated to dataflow entry fact a. For dataflow fact b, Block 604 shows the exit point of function "Foo" mapped to the node showing dataflow exit fact b. At one step backward, corresponding to the instruction c=b, the dataflow fact b is not modified. Hence the corresponding state of b remains unchanged. At the next step backward, dataflow exit fact b is propagated dataflow entry fact b. Block 604 further shows dataflow exit fact c at the function "Foo" exit point. At one step backward, c is assigned the Object b. The value of c is now the Object b. At the next step backward, the edge is shown going from c to dataflow entry fact b, and the data flow graphs for dataflow facts a, b, and c are completed. In the next step, the taint analysis engine (114) may create a data flow summary of the function "Foo", by removing intermediate dataflow facts from the data flow graph of the function "Foo". Accordingly, Block 606 shows the intermediate dataflow facts a, b, and c removed, with only the entry and exit dataflow facts preserved. Block 606 is therefore, the summarized data flow graph of the function "Foo".

Continuing with FIG. 6, an example is shown of a workflow 610, for augmenting data flows and function summaries of data flows with correlations using backward data flow analysis. Tracking path-sensitive dataflow and selecting those control flow pathways in a program or function code which have a direct effect on the dataflow fact being propagated, is referred to as "property simulation." In one or more embodiments, the taint analysis engine may generate the data flow graph and data flow summary for the function "Bar," in accordance with the steps described in reference to workflow 600. Further, the permissions checker may augment the data flow graph with correlations using property simulation analysis. In a first case, a correlation may correspond to a control flow pathway in the program code (or function code). In the first case, the state of the control flow pathway at a particular instruction is added to the data flow graph for a dataflow fact being tracked, for example, a correlation to a true branch of the control flow pathway. In a second case, a correlation fact may be a return value of a validator function or a sanitizer function. In the second case, the summarized data flow graph corresponding to the validator function is applied at the particular instruction in which the function is called. The validator function exit fact corresponding to the function summary is added to the dataflow fact at the particular instruction.

Accordingly, at Block 614, corresponding to the function exit point of function "Bar" shown in Block 612, the dataflow exit facts corresponding to dataflow entry facts a and b are shown with correlations added. The notation {a:c} may be read as "some property of a (e.g., the state of being "tainted") is positively correlated with c." In a similar manner, the notation {a:!c}, may be read as "a property of a is negatively correlated with c." Using backward dataflow propagation, the workflow (610) may proceed as described herein, in accordance with one or more embodiments: At the merge point of the function "Bar", dataflow exit fact a may be correlated with the true value of the branch condition c, in accordance with the logical boundary of the if clause. In a similar manner, at the merge point of the function "Bar," dataflow exit fact a may be correlated with the false value of the branch condition c, in accordance with the logical boundary of the else clause. The control pathway correlations c and !c added to a may yield {a:c} and {a:!c}. At the next step backward, within the logical boundary defined by the else conditional clause shown in Block 612, a is unchanged. Hence the dataflow fact a, remains as is. At the next step backward, within the logical boundary defined by the if conditional clause shown in Block 612, again, a remains unchanged. At the next step backward, the dataflow fact propagates back to dataflow entry fact a. Thus, a is not changed by either control flow pathway. Moreover, the augmented dataflow exit facts {a:c} and {a:!c} are inversely correlated. In accordance with property simulation analysis, inverse correlations (for the same dataflow fact, said dataflow fact remaining unchanged) may indicate that the preceding alternate control pathway clause (if . . . else) does not affect the value of (the dataflow fact) a. Hence, the inversely correlated dataflow facts are merged and replaced with {a}, as shown in Block 616.

However, in consideration of the dataflow exit fact b, the results of the property simulation analysis may indicate that the alternate control pathway clause (if . . . else) does, in fact, affect the value of the dataflow fact b: At the merge point of the function "Bar", dataflow exit fact b may be correlated with the true value of the branch condition c, in accordance with the logical boundary of the if clause. In a similar manner, at the merge point of the function "Bar," dataflow exit fact b may be correlated with the false value of the branch condition c, in accordance with the logical boundary of the else clause. Within the logical boundary defined by the else conditional clause shown in Block 612, b is unchanged. However, within the logical boundary defined by the if conditional clause shown in Block 612, b is assigned the value of a. The assignment statement b=a removes the dataflow fact b:c from b's dataflow path and adds the dataflow fact to a's dataflow path.

Thus, in contrast to dataflow fact a, dataflow fact b has two distinct data flow paths, correlated with the true branch of the conditional path flow, and the false branch of the conditional path flow. Hence, the data flow paths for b are not merged. The summarized data flow graph shown in Block 616 depicts the property simulation analysis result for dataflow facts a and b.

Figure 7:
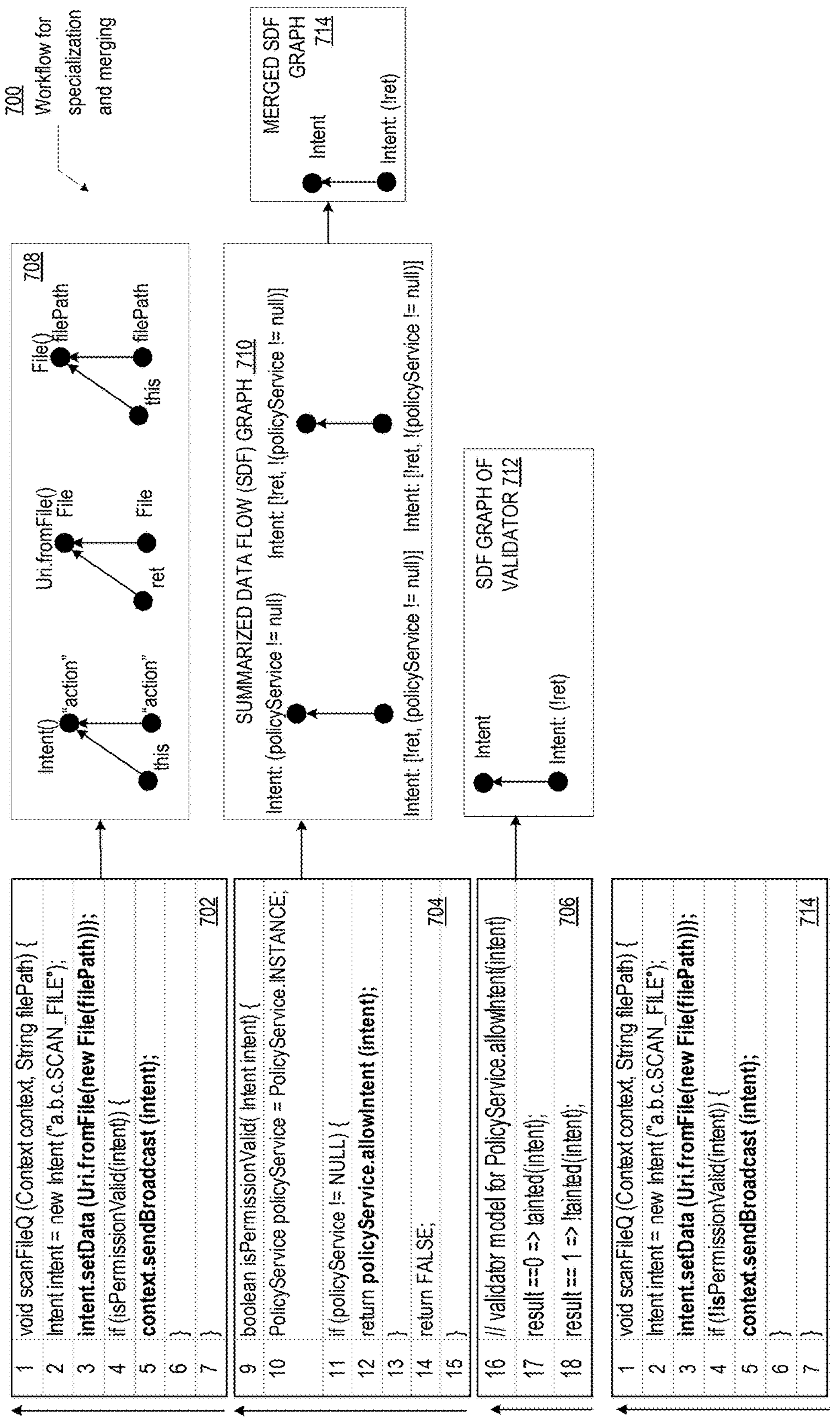
FIG. 7 shows an example of a workflow for augmenting a data flow with correlation facts and specialization of summaries, in accordance with one or more embodiments.

FIG. 7 depicts an example of a workflow for property simulation analysis performed by the permissions checker on the program code shown in Blocks 702-712. More particularly, the specialization process of resolving correlations and validator function exit facts is shown in FIG. 7. In one or more embodiments, the permissions checker may perform the specialization process. The specialization process may entail resolving correlations and called validator function exit facts in the unit of computer program code. The example of FIG. 7 is for explanatory purposes only and not intended to limit the scope of one or more embodiments.

Block 702 shows a function, scanFileQ, having parameters of class type Context and a string, filePath. A new Intent object is instantiated. The Intent object in the example may be an Android® Operating System Intent object. (Android® is a trademark of Google LLC.). An example of the Intent object instantiation data flow graph, namely, "Intent( )," is shown in Block 708. There are no conditional branches, validator function calls or other called functions in the Intent object instantiation function (object constructor function). Hence, the dataflow exit fact of the Intent object constructor is the pointer to the particular Intent object, namely, the "this" reference. The "this" reference is a construct in several diverse programming languages, for example, C++ programming language and JAVA® programming language, which is used to refer to the current object, in this case the Intent object. (JAVA® is a trademark owned by Oracle America, Inc.). The dataflow entry fact, namely, "action" remains unchanged. The "action" string refers to a pre-defined string specifying an action to be performed.

In a similar manner, example data flow graphs for Uri.fromFile( ) and the "File( )" constructor are shown in Block 708. In Android® Operating System, a URI (Uniform Resource Identifier) object represents a resource, such as a file or a content provider, by its location. The "File( )" function instantiates a new File object, with filePath as a dataflow entry fact. The dataflow entry fact remains unchanged, and the dataflow exit fact is the reference ("this") to the current File object. The "File( )" function is called from "Uri.fromFile( )." The data flow graph for "Uri.fromFile( )" therefore shows the dataflow entry fact as the File object. The dataflow entry fact remains unchanged. The "Uri.fromFile( )" returns a new URI object as the return value (ret).

The function "PolicyService.allowIntent( )" in Block 706 is a validator function. The validator function is modeled as shown in Block 712. The model may be read as follows: "if the return value of the function is false, intent was tainted prior to the function call. If the return value of the function is true, intent was untainted prior to the function call."

The property simulation analysis, performed in backward data flow sequence begins at the function exit points. Because the analysis is backward, the permissions checker may perform a preliminary control flow analysis step to obtain path conditions that need to be added to exit facts at each return statement. For example, the permissions checker may track the function isPermissionValid's exit fact {intent:(policyService!=null)} starting at line 12 of Block 704, because intent is correlated with the branching condition on line 11. The analysis then propagates the fact {intent:(policyService!=null)} back to line 1. To do the propagation, the analysis applies the summarized data flow graph for PolicyService.allowIntent, shown in Block 712.

In the caller function isPermissionValid shown in Block 704, the correlation on the true branch of the conditional path flow policyService!=null is added to the dataflow fact intent, to yield {intent:(policyService!=null)}. The called validator function has the validator function exit fact {intent:!ret}. The dataflow fact intent thus has two distinct correlations. Moreover, the two distinct correlations do not appear to be compatible (for example, direct inverse relationship). In this case, the permissions checker makes the two distinct correlations compatible by performing the specialization process.

The permissions checker specializes the caller function's dataflow exit fact by adding the correlation {!ret} that is present in the validator function exit fact. The added validator function exit fact makes the caller function's dataflow exit fact more specific. Accordingly, the permissions checker further updates the original caller function's dataflow exit fact to reflect that specificity. Thus, the updated caller function's dataflow exit fact is {intent:!ret, (policyService!=null)}. In the next step backward, at line 11 shown in Block 704, the dataflow fact intent is augmented with (policyService!=null) to yield {intent:(policyService!=null)} at line 11. The permissions checker propagates that the dataflow fact {intent:(policyService!=null)} back to the entry point of the function, completing a first data flow path of the data flow graph.

The permissions checker computes a second data flow path of the data flow graph, starting with the function isPermissionValid's dataflow exit fact {intent:[!ret, !(policyService!=null)]} at line 14, shown in Block 704. The correlation !(policyService!=null) comes from the false branch of isPermissionValid's conditional path flow. The additional correlation {!ret} comes from the return value of isPermissionValid. Because the function returns a false Boolean literal, the permissions checker may determine that any dataflow exit fact at line 14 must be correlated with the assignment ret=false. If the function instead returned true at line 14, any dataflow exit facts would correlate with the assignment ret=true. The dataflow exit fact {intent:[!ret, !(policyService!=null)]} remains unchanged along the control flow path from line 14 back to the function entry point, thus {intent:[!ret, !(policyService!=null)]} is also the dataflow entry fact. Block 710 shows the two data flow paths for the dataflow fact intent computed by the permissions checker for isPermissionValid.

The two data flow paths for isPermissionValid may share a significant amount of information, including information that may not be relevant outside the context of the function. To reduce the amount of information to be propagated to callers of the function isPermissionValid, the permissions checker may merge data flow paths of the data flow graph, if possible. The dataflow exit facts for both the data flow paths of intent include the correlation {!ret}, thus, the {!ret} correlation is preserved in the dataflow exit fact for intent. The other respective correlations on the dataflow exit fact intent, shown in Block 710, namely, (policyService!=null) and (!(policyService!=null)), are inverses of one another, and thus, may be merged together. Moreover, the dataflow entry facts for intent include the same inverse correlations (policyService!=null) and (!(policyService!=null)), respectively. Hence, the correlations are merged in the dataflow entry fact for intent. Finally, the second dataflow entry fact for intent has the correlation {!ret} and the first dataflow entry fact for intent does not correlate with {ret}. These correlations may additionally be merged, since absence of a correlation denotes "ret=true OR ret=false," which is more general than "ret=false."

After generating the summarized data flow graphs for the necessary functions, the permissions checker performs a backward traversal in the function scanFileQ. From the taint analysis context, in the function scanFileQ, the "sink" is context.sendBroadcast( ) and the "source" is intent.setData. The goal of the permissions checker is to determine whether the call to isPermissionValid correctly correlates with the branch condition guarding the call to context.sendBroadcast. The backward traversal from sink to source starts at line 5 of Block 702 (the sink operation) with the dataflow fact and correlation {intent:isPermissionValid( )}. The correlation between intent and the return value of isPermissionValid comes from the control flow of scanFileQ( ). At line 4 of Block 702, the permissions checker applies the summarized data flow graph for isPermissionValid. The exit fact for intent from isPermissionValid( ) is {intent:!ret} and the scanFileQ dataflow fact for intent at the call site (line 4 of Block 702) is {intent:isPermissionValid( )}. In the context of isPermissionValid, the correlation for intent in scanFileQ( ) becomes {intent:ret}, since the control flow depends on isPermissionValid returning a true Boolean value. Since the dataflow facts {intent: ret} and {intent: !ret} have incompatible correlations, the permissions checker cannot perform the specialization process. Thus, the summarized data flow graph for isPermissionValid cannot be applied. The backward traversal from the sink for the dataflow fact intent stops, or is blocked, at the call to isPermissionValid without reaching the source, and no defect is reported.

Block 714 shows an alternate example of the function scanFileQ. In this example, the path condition is inverted, as shown in line 4 of Block 714. In this case, the broadcast is sent when permission has been denied. As in the previous example of Block 702, the permissions checker starts the analysis at line 5. In the example of Block 714, however, the initial fact is {intent: !isPermissionValid ( )}. When the permissions checker applies the summarized data flow graph for isPermissionValid at line 4, the function exit fact for intent from isPermissionValid is {intent:!ret} and the correlation for intent in scanFileQ( ) is {intent:!isPermissionValid( )}. In the context of isPermissionValid, the dataflow fact for intent in scanFileQ( ) is {intent:!ret}. The calling function dataflow fact and called function dataflow exit facts are the same, so the permissions checker applies the summarized data flow graph for isPermissionValid, yielding the dataflow fact {intent} at line 3. Thus, the backward traversal from the sink for the dataflow fact intent reaches a source and the permissions checker reports an error.

FIG. 8 shows an example of a workflow for creating a summarized data flow graph for a derived object in a unit of computer program code. Block 802 shows an example of a function returning a result of an operation on a derived object. The derived object is a local object that is instantiated, or otherwise based on a dataflow entry fact from a taint source. As shown in Block 802, the derived object is the object request, which is instantiated from the dataflow entry fact intent. In this case, the permission checker models PolicyService.allowIntent (request) as an exit fact creator. If the permission checker determines that the return value of a calling function (isPermissionValid) flows to the return value of a validator (PolicyService.allowIntent), the permissions checker creates a new data flow path to track the dataflow fact that flows into the validator. If the dataflow fact that flows into the validator is a local variable, the permission checker creates a new data flow path in the function that calls the validator to track the flow of the local variable.

When applying the summarized data flow graph for PolicyService.allowIntent at line 12 of Block 802, the permission checker determines that the value flowing into PolicyService.allowIntent is local and creates a new dataflow fact and corresponding data flow path for request, namely, {request: !ret}. The permission checker adds the correlation {!ret} because request may be tainted when PolicyService.allowIntent returns false. The permission checker propagates the new dataflow fact to the function entry point, yielding a new data flow path for the dataflow fact request, as shown in Block 804. Further, the permissions checker performs a summary refinement operation, to make use of the new data flow path for the local variable.

The permission checker further refines the summarized data flow paths of the data flow graph by identifying sets of distinct data flow paths for the same initial value and determining the most specific correlations that can be derived from that set. The summary refinement operation may be performed in accordance with the flowchart 400 shown in FIG. 4. In the example of FIG. 8, the full set of computed data flow paths for the dataflow facts of isPermissionValid is {intent}—{intent} and {request: !ret}—{intent}. The permission checker checks if the correlations on the dataflow exit fact of request ({!ret}) imply the correlations on the dataflow exit fact of intent. In this case they do, hence the permission checker makes the dataflow exit fact of intent more specific, yielding {intent: !ret}—{intent}, as shown in Block 806. When this summarized data flow graph of Block 806 is applied in the calling function scanFileQ shown in Block 808, the permissions checker correctly determines that intent is not tainted in the call to Context.sendBroadcast on line 5 of Block 808.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 9A:
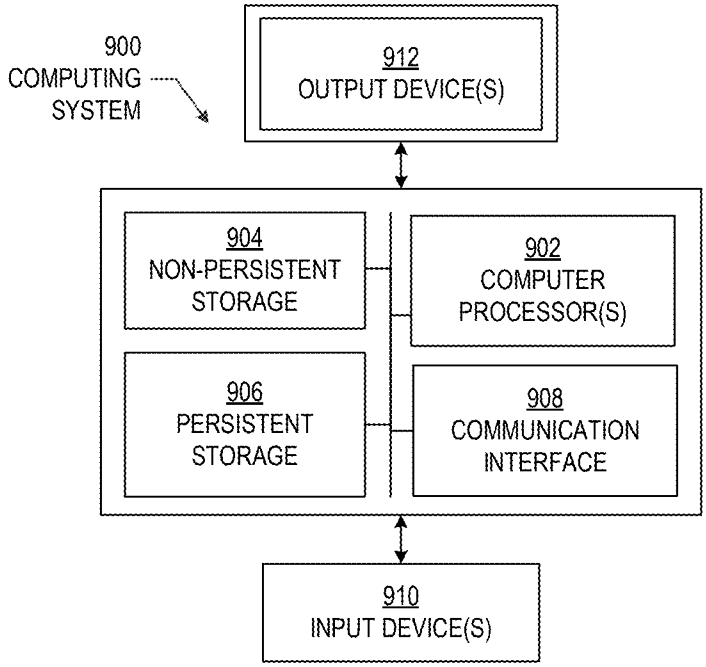
FIG. 9A and FIG. 9B show a system, in accordance with one or more embodiments.

For example, as shown in FIG. 9A, the computing system (900) may include one or more computer processor(s) (902), non-persistent storage device(s) (904), persistent storage device(s) (906), a communication interface (908) (e.g., Bluetooth interface, infrared interface, network interface, optical interface, etc.), and numerous other elements and functionalities that implement the features and elements of the disclosure. The computer processor(s) (902) may be an integrated circuit for processing instructions. The computer processor(s) (902) may be one or more cores, or micro-cores, of a processor. The computer processor(s) (902) includes one or more processors. The computer processor(s) (902) may include a central processing unit (CPU), a graphics processing unit (GPU), a tensor processing unit (TPU), combinations thereof, etc.

The input device(s) (910) may include a touchscreen, keyboard, mouse, microphone, touchpad, electronic pen, or any other type of input device. The input device(s) (910) may receive inputs from a user that are responsive to data and messages presented by the output device(s) (912). The inputs may include text input, audio input, video input, etc., which may be processed and transmitted by the computing system (900) in accordance with one or more embodiments. The communication interface (908) may include an integrated circuit for connecting the computing system (900) to a network (not shown) (e.g., a local area network (LAN), a wide area network (WAN) such as the Internet, mobile network, or any other type of network) or to another device, such as another computing device, and combinations thereof.

Further, the output device(s) (912) may include a display device, a printer, external storage, or any other output device. One or more of the output device(s) (912) may be the same or different from the input device(s) (910). The input device(s) (910) and output device(s) (912) may be locally or remotely connected to the computer processor(s) (902). Many different types of computing systems exist, and the aforementioned input device(s) (910) and output device(s) (912) may take other forms. The output device(s) (912) may display data and messages that are transmitted and received by the computing system (900). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (902), is configured to perform one or more embodiments, which may include transmitting, receiving, presenting, and displaying data and messages described in the other figures of the disclosure.

Figure 9B:
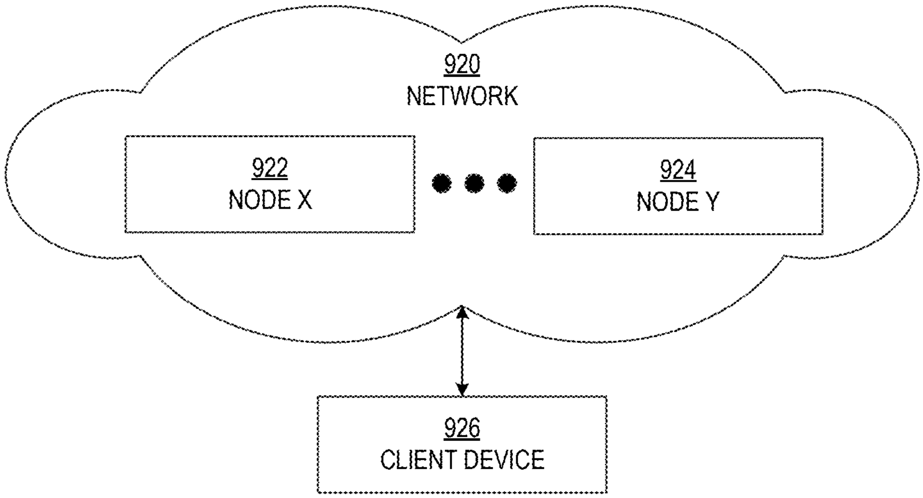

The computing system (900) in FIG. 9A may be connected to, or be a part of, a network. For example, as shown in FIG. 9B, the network (920) may include multiple nodes (e.g., node X (922) and node Y (924), as well as extant intervening nodes between node X (922) and node Y (924)). Each node may correspond to a computing system, such as the computing system shown (900) in FIG. 9A, or a group of nodes combined may correspond to the computing system (900) shown in FIG. 9A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

The nodes (e.g., node X (922) and node Y (924)) in the network (920) may be configured to provide services for a client device (926). The services may include receiving requests and transmitting responses to the client device (926). For example, the nodes may be part of a cloud computing system. The client device (926) may be a computing system, such as the computing system (900) shown in FIG. 9A. Further, the client device (926) may include or perform all or a portion of one or more embodiments.

The computing system (900) of FIG. 9A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

obtaining a data flow graph of a unit of computer program code, the unit of computer program code including a dataflow fact, and the data flow graph having a data flow path corresponding to the dataflow fact;

augmenting the data flow graph by adding, according to an instruction type in the unit of computer program code, a correlation to the dataflow fact of the data flow graph, wherein the dataflow fact corresponds to a node of the data flow graph and the correlation characterizes a relationship of a property of the dataflow fact, to obtain an augmented data flow graph having a first plurality of data flow paths corresponding to the dataflow fact; and obtaining a transformed data flow graph having a second plurality of data flow paths corresponding to the dataflow fact by merging a first data flow path and a second data flow path of the first plurality of data flow paths corresponding to the dataflow fact, wherein merging comprises removing the correlation of the dataflow fact from a merged data flow path and preserving a common correlation of the dataflow fact in the merged data flow path.

2. The method of claim 1, wherein augmenting the data flow graph by adding the correlation to the dataflow fact of the data flow graph according to the instruction type comprises performing at least one selected from a group consisting of:

adding a conditional path correlation to the dataflow fact of the data flow graph corresponding to a conditional path branch of the unit of computer program code, adding a validator function correlation to the dataflow fact of the data flow graph corresponding to a validator function of the unit of computer program code operating on the dataflow fact, and adding a called function correlation to the dataflow fact of the data flow graph corresponding to a called function of the unit of computer program code operating on the dataflow fact.

3. The method of claim 1, further comprising:

selecting a candidate data flow path from the second plurality of data flow paths corresponding to the dataflow fact, wherein the candidate data flow path includes an exit node of the unit of computer program code corresponding to the dataflow fact, and an entry node of the unit of computer program code corresponding to the dataflow fact;

traversing the candidate data flow path from the exit node to the entry node; and reporting an error responsive to the entry node being reachable from the exit node in traversing the candidate data flow path.

4. The method of claim 1, wherein the unit of computer program code includes at least one of a main program source code and a function source code.

5. The method of claim 4, wherein the data flow path of the data flow graph includes an exit node corresponding to the dataflow fact at an exit point of the unit of computer program code, and an entry node corresponding to the dataflow fact at an entry point of the unit of computer program code.

6. The method of claim 1, further comprising:

identifying a conditional path branch of the unit of computer program code affecting the dataflow fact;

generating a conditional path correlation for the dataflow fact based on a conditional path branch value, wherein the correlation is the conditional path correlation; and adding the conditional path correlation to the dataflow fact.

7. The method of claim 1, further comprising:

applying a validator function summary corresponding to a validator function of the unit of computer program code operating on the dataflow fact to obtain a validator function correlation, wherein the correlation is the validator function correlation; and adding the validator function correlation to the dataflow fact.

8. The method of claim 1, further comprising:

applying a called function summary corresponding to a called function of the unit of computer program code operating on the dataflow fact to obtain a called function correlation, wherein the correlation is the called function correlation; and adding the called function correlation to the dataflow fact.

9. The method of claim 1, further comprising:

merging the first data flow path and the second data flow path of the first plurality of data flow paths corresponding to the dataflow fact by:

merging the first data flow path and the second data flow path responsive to the first data flow path having a first correlation of the dataflow fact that is mutually inverse to a second correlation of the dataflow fact in the second data flow path to further obtain the merged data flow path, and removing the first correlation and the second correlation from the dataflow fact in the merged data flow path, merging the first data flow path and the second data flow path responsive to the first data flow path having the first correlation of the dataflow fact that implies the second correlation of the dataflow fact in the second data flow path, and removing the first correlation and the second correlation from the dataflow fact in the merged data flow path, and preserving the common correlation of the dataflow fact from the first data flow path and the second data flow path in the merged data flow path.

10. The method of claim 1, further comprising:

identifying a caller function exit point of a caller function in the unit of computer program code returning a local validator function operating on a local variable of the caller function, wherein the local variable is derived from a dataflow entry fact of the caller function;

generating a new dataflow fact for the local variable in the caller function;

generating a new data flow path for the new dataflow fact in the caller function; and adding the new data flow path to a caller function data flow graph.

11. The method of claim 10, further comprising:

identifying a first caller function data flow path and a second caller function data flow path of the caller function data flow graph, having the same dataflow entry fact;

obtaining a first correlation of a first dataflow exit fact of the first caller function data flow path;

obtaining a second correlation of a second dataflow exit fact of the second caller function data flow path; and responsive to the first correlation implying the second correlation, adding the first correlation of the first dataflow exit fact to the second dataflow exit fact, and removing the second correlation from the second dataflow exit fact.

12. A system comprising:

at least one computer processor;

a graphical user interface (GUI), executing on the at least one computer processor, and a data repository; and a permissions checker, executing on the at least one computer processor, configured to cause the at least one computer processor to perform operations comprising:

obtaining a data flow graph of a unit of computer program code from the data repository, the unit of computer program code comprising a dataflow fact, and the data flow graph having a data flow path corresponding to the dataflow fact, augmenting the data flow graph by adding, according to an instruction type in the computer program code, a correlation to the dataflow fact of the data flow graph, wherein the dataflow fact corresponds to a node of the data flow graph and the correlation characterizes a relationship of a property of the dataflow fact, to obtain an augmented data flow graph having a first plurality of data flow paths corresponding to the dataflow fact, and obtaining a transformed data flow graph having a second plurality of data flow paths corresponding to the dataflow fact by merging a first data flow path and a second data flow path of the first plurality of data flow paths corresponding to the dataflow fact, wherein merging comprises removing the correlation of the dataflow fact from a merged data flow path and preserving a common correlation of the dataflow fact in the merged data flow path.

13. The system of claim 12, wherein augmenting the data flow graph by adding the correlation to the dataflow fact of the data flow graph according to the instruction type comprises performing at least one selected from a group consisting of:

adding a conditional path correlation to the dataflow fact of the data flow graph corresponding to a conditional path branch of the unit of computer program code, adding a validator function correlation to the dataflow fact of the data flow graph corresponding to a validator function of the unit of computer program code operating on the dataflow fact, and adding a called function correlation to the dataflow fact of the data flow graph corresponding to a called function of the unit of computer program code operating on the dataflow fact.

14. The system of claim 12, wherein the operations further comprise:

selecting a candidate data flow path from the second plurality of data flow paths corresponding to the dataflow fact, wherein the candidate data flow path includes an exit node corresponding to the dataflow fact at an exit point of the unit of computer program code, and an entry node corresponding to the dataflow fact at an entry point of the unit of computer program code;

traversing the candidate data flow path from the exit node to the entry node; and reporting an error to the GUI, responsive to the entry node being reachable from the exit node in traversing the candidate data flow path.

15. The system of claim 12, wherein the operations further comprise:

identifying a conditional path branch of the unit of computer program code affecting the dataflow fact;

generating a conditional path correlation for the dataflow fact based on a conditional path branch value, wherein the correlation is the conditional path correlation; and adding the conditional path correlation to the dataflow fact.

16. The system of claim 12, wherein the operations further comprise:

applying a validator function summary corresponding to a validator function of the unit of computer program code operating on the dataflow fact to obtain a validator function correlation, wherein the correlation is the validator function correlation; and adding the validator function correlation to the dataflow fact.

17. The system of claim 12, wherein the operations further comprise:

applying a called function summary corresponding to a called function of the unit of computer program code operating on the dataflow fact to obtain a called function correlation, wherein the correlation is the called function correlation; and adding the called function correlation to the dataflow fact.

18. The system of claim 12, wherein the operations further comprise:

merge the first data flow path and the second data flow path of the first plurality of data flow paths corresponding to the dataflow fact by:

merging the first data flow path and the second data flow path responsive to the first data flow path having a first correlation of the dataflow fact that is mutually inverse to a second correlation of the dataflow fact in the second data flow path to further obtain the merged data flow path, and removing the first correlation and the second correlation from the dataflow fact in the merged data flow path, merging the first data flow path and the second data flow path responsive to the first data flow path having the first correlation of the dataflow fact that implies the second correlation of the dataflow fact in the second data flow path, and removing the first correlation and the second correlation from the dataflow fact in the merged data flow path, and preserving the common correlation of the dataflow fact from the first data flow path and the second data flow path in the merged data flow path.

19. A non-transitory computer readable medium comprising instructions executable by at least one computer processor to perform operations comprising:

obtaining a data flow graph of a unit of computer program code, the unit of computer program code including a dataflow fact, and the data flow graph having a data flow path corresponding to the dataflow fact;

augmenting the data flow graph by adding, according to an instruction type in the computer program code, a correlation to the dataflow fact of the data flow graph, wherein the dataflow fact corresponds to a node of the data flow graph and the correlation characterizes a relationship of a property of the dataflow fact, to obtain an augmented data flow graph having a first plurality of data flow paths corresponding to the dataflow fact; and obtaining a transformed data flow graph having a second plurality of data flow paths corresponding to the dataflow fact by merging a first data flow path and a second data flow path of the first plurality of data flow paths corresponding to the dataflow fact, wherein merging comprises removing the correlation of the dataflow fact from a merged data flow path and preserving a common correlation of the dataflow fact in the merged data flow path.

20. The non-transitory computer readable medium of claim 19, wherein the operations further comprise:

selecting a candidate data flow path from the second plurality of data flow paths corresponding to the dataflow fact, wherein the candidate data flow path includes an exit node corresponding to the dataflow fact at an exit point of the unit of computer program code, and an entry node corresponding to the dataflow fact at an entry point of the unit of computer program code;

traversing the candidate data flow path from the exit node to the entry node; and reporting an error responsive to the entry node being reachable from the exit node in traversing the candidate data flow path.

* * * * *